(12) United States Patent
Schultz

(10) Patent No.: US 11,097,283 B2
(45) Date of Patent: Aug. 24, 2021

(54) SYSTEMS AND METHODS FOR MUNICIPAL SOLID WASTE RECYCLING FACILITY

(71) Applicant: NEW PLANET ENERGY DEVELOPMENT LLC, Los Angeles, CA (US)

(72) Inventor: John Schultz, Miami, FL (US)

(73) Assignee: New Planet Energy Development LLC, Los Angeles, CA (US)

(*) Notice: Subject to any disclaimer, the term of this patent is extended or adjusted under 35 U.S.C. 154(b) by 214 days.

(21) Appl. No.: 16/175,147

(22) Filed: Oct. 30, 2018

(65) Prior Publication Data

US 2020/0129989 A1    Apr. 30, 2020

(51) Int. Cl.

| | |
|---|---|
| B02C 23/38 | (2006.01) |
| B03B 9/06 | (2006.01) |
| B02C 23/16 | (2006.01) |
| B02C 25/00 | (2006.01) |
| B02C 23/10 | (2006.01) |
| B02C 23/02 | (2006.01) |
| F23G 5/00 | (2006.01) |
| F23G 5/02 | (2006.01) |
| C10L 5/40 | (2006.01) |
| F23G 5/46 | (2006.01) |

(52) U.S. Cl.
CPC ............. *B02C 23/38* (2013.01); *B02C 23/02* (2013.01); *B02C 23/10* (2013.01); *B02C 23/16* (2013.01); *B02C 25/00* (2013.01); *B03B 9/06* (2013.01); *C10L 5/40* (2013.01); *F23G 5/006* (2013.01); *F23G 5/02* (2013.01); *F23G 5/46* (2013.01); *F23G 2201/602* (2013.01); *F23G 2201/603* (2013.01)

(58) Field of Classification Search
CPC ......... B02C 25/00; B02C 23/16; B02C 23/38; B02C 23/10; B02C 23/02
See application file for complete search history.

(56) References Cited

U.S. PATENT DOCUMENTS

| | | | |
|---|---|---|---|
| 2,840,462 | A | 6/1958 | Gorin |
| 3,236,604 | A | 2/1966 | Pierson |
| 3,524,594 | A | 8/1970 | Anderson et al. |

(Continued)

FOREIGN PATENT DOCUMENTS

| | | |
|---|---|---|
| CA | 2976409 A1 | 8/2016 |
| FR | 2534926 A1 | 4/1984 |
| KR | 20080081875 A | 9/2008 |

OTHER PUBLICATIONS

International Search Report and Written Opinion, dated Jan. 17, 2020, for related International application No. PCT/US19/58778 (17 pgs.).

(Continued)

*Primary Examiner* — Faye Francis
(74) *Attorney, Agent, or Firm* — Armstrong Teasdale LLP

(57) ABSTRACT

A municipal solid waste recycling facility for producing a solid recovered fuel is provided. The municipal solid waste recycling facility includes a pre-shredding unit and a shredding unit. The pre-shredding unit includes a trommel configured to sort a first stream of solid waste by size into a second stream of solid waste and a third stream of solid waste. The shredding unit includes a primary shredder configured to shred the second stream of solid waste.

9 Claims, 28 Drawing Sheets

(56) References Cited

U.S. PATENT DOCUMENTS

| | | | |
|---|---|---|---|
| 3,604,179 A | 9/1971 | Lund | |
| 3,784,115 A * | 1/1974 | Krijger | G05D 7/0605 |
| | | | 241/30 |
| 3,817,725 A | 6/1974 | Sieg et al. | |
| 3,907,519 A | 9/1975 | Sieg et al. | |
| 4,264,352 A | 4/1981 | Houser | |
| 4,874,134 A | 10/1989 | Wiens | |
| 5,009,370 A | 4/1991 | MacKenzie | |
| 5,119,994 A | 6/1992 | Placzek | |
| 5,190,226 A | 3/1993 | Holloway | |
| 5,779,154 A | 7/1998 | Martin | |
| 6,422,493 B1 | 7/2002 | Simon et al. | |
| 6,588,690 B1 | 7/2003 | Koenig | |
| 6,752,337 B2 | 6/2004 | Koenig | |
| 7,226,006 B2 | 6/2007 | Porter et al. | |
| 8,006,925 B2 * | 8/2011 | Liu | B02C 25/00 |
| | | | 241/23 |
| 8,652,222 B2 | 2/2014 | Raman et al. | |
| 8,684,288 B2 | 4/2014 | Gitschel | |
| 8,748,687 B2 | 6/2014 | Sirdeshpande | |
| 8,800,898 B2 | 8/2014 | Alford | |
| 2008/0202993 A1 | 8/2008 | Eley et al. | |
| 2009/0008298 A1 | 1/2009 | Studley | |
| 2009/0032442 A1 | 2/2009 | Singh et al. | |
| 2012/0190102 A1 | 7/2012 | Gitschel et al. | |
| 2014/0014748 A1 * | 1/2014 | Zeeck | F23G 5/033 |
| | | | 241/18 |
| 2014/0101990 A1 | 4/2014 | Rhatigan et al. | |
| 2016/0250648 A1 * | 9/2016 | Yuan | B02C 23/02 |
| | | | 241/76 |
| 2017/0341084 A1 * | 11/2017 | Brouwer | B02C 19/0056 |
| 2017/0349484 A1 * | 12/2017 | Baumgartenn | C21C 5/36 |
| 2018/0036803 A1 * | 2/2018 | Yamamoto | B02C 23/38 |
| 2018/0056344 A1 * | 3/2018 | Wei | C01F 11/28 |
| 2018/0195236 A1 | 7/2018 | Benedek et al. | |

OTHER PUBLICATIONS

"CP Group Introduces Auger Screen" by CP Group; Apr. 11, 2018; p. 1 Paragraph 4 (4 pages).

* cited by examiner

SYSTEMS AND METHODS FOR MUNICIPAL SOLID WASTE RECYCLING FACILITY

BACKGROUND

The subject matter described herein relates generally to municipal solid waste recycling facilities and, more particularly, to systems and methods for controlling the energy content of solid recovered fuels produced by municipal solid waste recycling facilities.

At least some known municipal solid waste recycling facilities convert a stream of municipal solid waste into a Solid Recovered Fuel (SRF). SRF is typically defined by International Standards and includes solid, organic recyclable and non-recyclable waste including miscellaneous wastes, wood, textiles, non-recyclable paper, and non-recyclable plastics. SRF is typically the solid waste that cannot economically be recycled into other products. Specifically, at least some known municipal solid waste recycling facilities sort a stream of municipal solid waste into a stream of recyclable material and a steam of SRF.

While it is important for a facility meet the specific energy requirement of the International Standards, greatly exceeding the minimum specific energy value does not increase revenue from the sale of the SRF. As such, the economics of the municipal solid waste recycling facility is improved when the facility produces SRF with a specific energy that exactly matches the requirement set in the International Standards or within a narrow range above the minimum specific energy value set by International Standards.

While at least some know municipal solid waste recycling facilities monitor the specific energy of the SRF they produce, these recycling facilities only monitor the specific energy of the SRF at a single location within the facility, typically at the end of the SRF production process. However, because SRF is produced from a fluctuating municipal solid waste feed stream, the SRF produced by the facility will not have a reliable or consistent specific energy value without active monitoring and control. Only monitoring the specific energy at a single location or at the end of the SRF production process does not allow the facility to actively control the specific energy of the SRF.

Additionally, at least some known municipal solid waste recycling facilities shred the municipal solid waste as a first unit operation within the facility. Typically, the municipal solid waste is feed directly into a primary shredder on the front end of the recycling process. The primary shredder typically includes a plurality of rotating teeth configured to shred the waste to a predetermined size. However, the unsorted municipal solid waste may contain large, bulky, or difficult to shred materials that may clog or otherwise impair the operation of the primary shredder, increasing the downtime of the facility.

BRIEF DESCRIPTION

In one aspect, a municipal solid waste recycling facility for producing a solid recovered fuel is provided. The municipal solid waste recycling facility includes a pre-shredding unit and a shredding unit. The pre-shredding unit includes a trommel configured to sort a first stream of solid waste by size into a second stream of solid waste and a third stream of solid waste. The shredding unit includes a primary shredder configured to shred the second stream of solid waste.

In another aspect, a municipal solid waste recycling facility for producing a solid recovered fuel is provided. The municipal solid waste recycling facility includes a pre-shredding unit, a shredding unit, a plurality of analyzing stations, and a control unit. The pre-shredding unit includes a trommel configured to sort a first stream of solid waste by size into a second stream of solid waste and a third stream of solid waste. The shredding unit includes a primary shredder configured to shred the second stream of solid waste. The plurality of analyzing stations are configured to detect and collect data on a specific energy of two solid waste streams within the municipal solid waste recycling facility. The control unit is communicatively coupled to the plurality of analyzing stations such that the control unit receives the collected data from the plurality of analyzing stations. The control unit is configured to control the trommel based on the collected data.

In yet another aspect, a method of manufacturing a solid recovered fuel is provided. The method includes conveying a first stream of solid waste to a pre-shredding unit including a trommel. The method also includes separating, with the trommel, the first stream of solid waste into a second stream of solid waste and a third stream of solid waste. The method further includes conveying the second stream of solid waste to a primary shredding unit including a primary shredder. The method also includes shredding the second stream of solid waste to produce a fourth stream of solid waste with the primary shredder. The method further includes conveying the fourth stream of solid waste to a solid recovered fuel production unit. The method also includes producing a stream of solid recovered fuel with the solid recovered fuel production unit.

In yet another aspect, a method of manufacturing a solid recovered fuel is provided. The method includes conveying a first stream of solid waste to a pre-shredding unit including a trommel. The method also includes detecting and collecting specific energy data on the first stream of solid waste with a first analyzing station. The method further includes sending the collected specific energy data to a control unit. The method also includes separating, with the trommel, the first stream of solid waste into a second stream of solid waste and a third stream of solid waste. The method further includes conveying the second stream of solid waste to a solid recovered fuel production unit. The method also includes producing a stream of solid recovered fuel with the solid recovered fuel production unit.

DRAWINGS

These and other features, aspects, and advantages of the present disclosure will become better understood when the following detailed description is read with reference to the accompanying drawings in which like characters represent like parts throughout the drawings, wherein.

Figure 1:
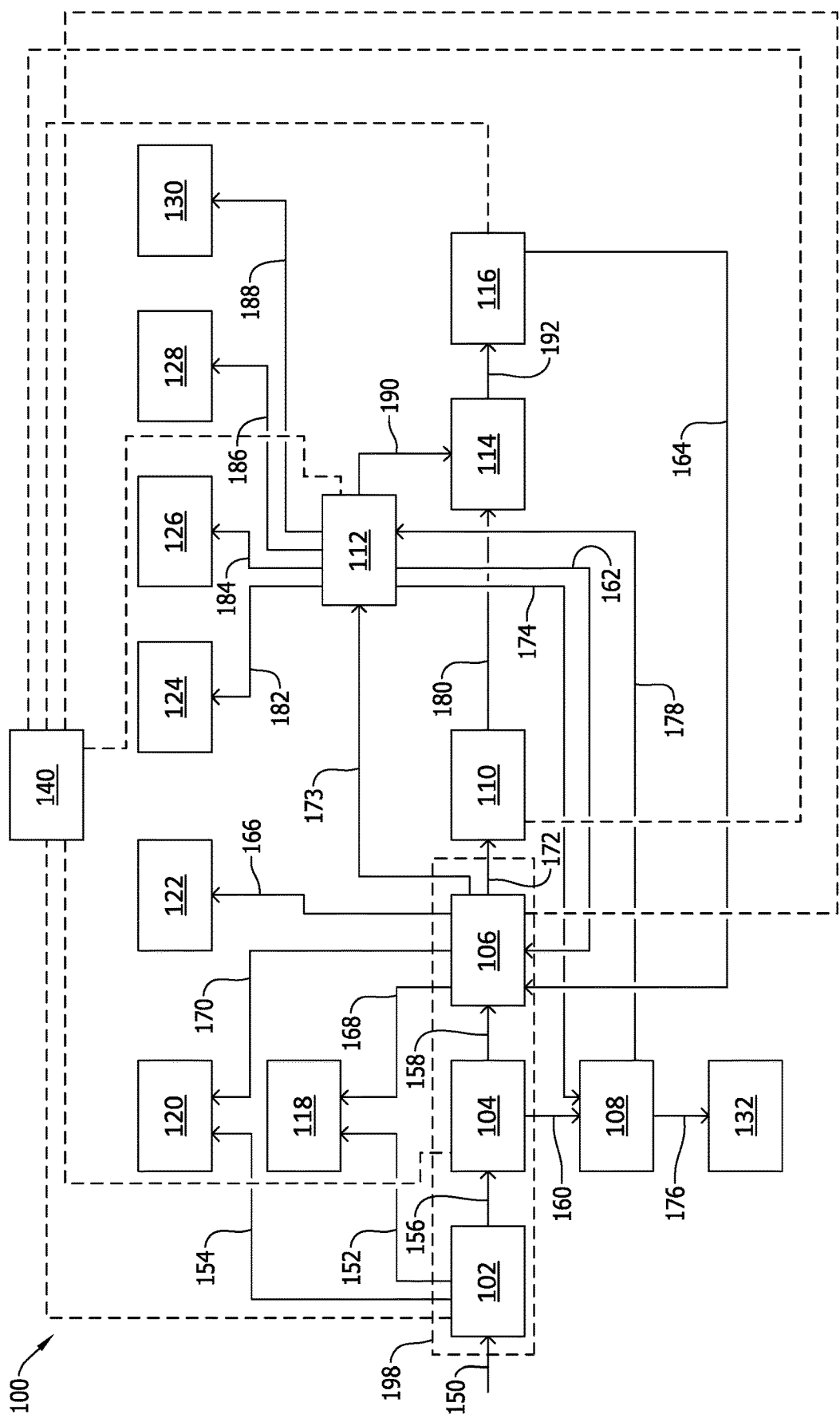
FIG. 1 is a block flow diagram of an exemplary Municipal Solid Waste Recycling Process.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device.

Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and methods described herein include a Municipal Solid Waste Recycling (MSWR) Process configured to produce SRF from solid municipal waste. MSWR process is typically housed within a MSWR facility and includes at least a pre-shredding unit, a shredding unit, a SRF production unit and a control unit. The pre-shredding unit receives a steam of municipal solid waste and sorts the steam of municipal solid waste by size and content. Specifically, the pre-shredding unit removes large, bulky, or difficult to shred materials from the municipal solid waste stream that may clog or otherwise impair the operation of the primary shredder, increasing the downtime of the facility. The pre-shredding unit conveys the sorted solid waste stream to the primary shredder where it is shredded to a predetermined size. The shredded solid waste is then conveyed to the SRF production unit where it is converted into SRF. Pre-sorting the municipal solid waste in the pre-shredding unit reduces the down time of MSWR facility by removing large, bulky, or difficult to shred materials from the municipal solid waste stream that may clog or otherwise impair the operation of the primary shredder.

The control unit includes a plurality of analyzing stations and optical sensors positioned within the MSWR facility and configured to detect and analyze specific solid waste material streams within the MSWR facility. The analyzing stations are configured to detect and collect specific energy data of the analyzed solid waste material streams. The collected specific energy data is sent to the control unit, and the control unit controls the MSWR process based on the collected specific energy data. Specifically, because the analyzing stations are located throughout the MSWR facility, the analyzing stations collect specific energy data from waste streams throughout the MSWR process. The collected specific energy data allows the control unit to control the MSWR process such that the specific energy of the final SRF product meets or exceeds the desired level. Accordingly, the control unit and the analyzing stations improve the economics of the MSRW facility by ensuring a more consistent product.

FIG. 1 is a block flow diagram of an exemplary Municipal Solid Waste Recycling Process 100 or MSWR Process 100. MSWR process 100 is configured to sort a solid waste stream, such as, but not limited to, a stream of commercial and residential garbage, into a plurality of recyclable solid waste stream and a Solid Recovered Fuel (SRF) stream. The recyclable solid waste streams each include recyclable materials such as, but not limited to, plastics, paper, metal, cardboard, and glass while the SRF stream typically includes miscellaneous wastes, wood, textiles, non-recyclable paper, and non-recyclable plastics. After the solid waste stream has been sorted into the recyclable steams and SRF stream, the recyclable solid waste streams are sent to an appropriate recycling facility and the SRF stream is sent to a SRF handling facility.

International Standards set standards for the production of SRF. Specifically, at least some international standards include a minimum specific energy value, a maximum mercury content value, a maximum chlorine content value, and a maximum moisture content value. MSWR process 100 described herein is configured to produce SRF that is consistently compliant with all parameters included in the relevant International Standards.

For example, MSWR process 100 includes a control scheme configured to ensure that the final SRF stream has a specific energy that meets or exceeds the desired specific energy value. In the exemplary embodiment, the minimum specific energy value is 10,000 British Thermal Units per pound mass ($BTU/lb_m$) while the predetermined specific energy value may be 10,001 $BTU/lb_m$ and the predetermined specific energy range may be 10,001 $BTU/lb_m$ to 10,005 $BTU/lb_m$. If the final SRF stream has a specific energy lower than the predetermined specific energy value or is not within the predetermined specific energy range, the final SRF stream is recycled back into MSWR process 100. Additionally, the final SRF stream is also recycled back into MSWR process 100 if the mercury content, chlorine content, or moisture content exceeds the maximum mercury content value, maximum chlorine content value, or maximum moisture content value.

MSWR process 100 includes a pre-sort unit 102, a sort unit 104, a post-sort unit 106, a glass separation unit 108, a primary shredding unit 110, a physical separation unit 112, a secondary shredding unit 114, a SRF production unit 116, a plurality of recyclable material units 118, 120, 122, 124, 126, 128, 130, and 132. Recyclable material units 118, 120, 122, 124, 126, 128, 130, and 132 include a mixed metal unit 118, a residue unit 120, an 00C Unit 122, a ferrous metal unit 124, a ferrous metal unit 126, a High-Density Polyethylene (HDPE) unit 128, a Polyethylene Terephthalate (PET) unit 130, and a sand unit 132. MSWR process 100 is configured to sort the solid waste stream to SRF production unit 116 and recyclable material units 118, 120, 122, 124, 126, 128, 130, and 132. Solid lines within the figures represent material transfer streams and dashed lines represent control/information communication lines.

MSWR process 100 also includes a control unit 140. Control unit 140 is configured to control MSWR process 100 such that MSWR process 100 produces SRF that meets the desired values. Specifically, control unit 140 includes a plurality of analyzing stations 206, 504, 506, 710, 712, 1504, 1734, 2202, and 2206 (not shown in FIG. 1) configured to analyze the solid waste streams as they are processed by MSWR process 100. Control unit 140 then uses the data collected by analyzing stations 206, 504, 506, 710, 712, 1504, 1734, 2202, and 2206 to control MSWR process 100. For example, control unit 140 may increase the amount of plastics, which have a higher specific energy, sent to SRF production unit 116 to increase the specific energy of the final SRF stream if analyzing stations 206, 504, 506, 710, 712, 1504, 1734, 2202, and 2206 determine that the specific energy is not within the predetermined specific energy range. Additionally, control unit 140 may recycle the final SRF stream back into MSWR process 100 if the final SRF stream does not have a specific energy within the predetermined specific energy range. Furthermore, control unit 140 may increase or decrease the processing speed throughout MSWR process 100 to continuously monitor and control the specific energy of the final SRF stream. As such, MSWR process 100 includes control system or control unit 140 and analyzing stations 206, 504, 506, 710, 712, 1504, 1734, 2202, and 2206 which control MSWR process 100 such that the specific energy of the final SRF stream is controlled within the predetermined specific energy range that meets or exceeds international specific energy standards to reduce waste generated by MSWR process 100 and improve the economics of MSWR process 100.

Additionally, control unit 140 includes a plurality of optical sensors 1706, 1708, 1710, and 1712 (shown in FIG. 17) configured to detect plastics that include mercury and chlorine in the solid waste stream. MSWR process 100 then removes these mercury and chlorine containing plastics from the solid waste stream before the solid waste stream is conveyed to SRF production unit 116.

In the exemplary embodiment, control unit 140 is a control system architecture that uses computers, networked data communications, and graphical user interfaces to manage and control MSWR process 100. Specifically, in the exemplary embodiment, control unit is a Supervisory Control And Data Acquisition (SCADA) control system. Control unit 140 and SCADA control system may also include programmable logic controllers (PLCs) and discrete proportional-integral-derivative (PID) controllers to manage and control MSWR process 100. However, control unit 140 is not limited using SCADA control systems. Control unit 140 may use any control system architecture that enables MSWR process 100 to operate as described herein.

As shown in FIG. 1, pre-sort unit 102 receives a solid waste stream 150 and is configured to meter solid waste stream 150 coming into MSWR process 100. Specifically, pre-sort unit 102 includes a first analyzing station 206 (shown in FIGS. 2 and 4) which controls the flow of solid waste stream 150 into MSWR process 100 based, in part, on the specific energy of solid waste stream 150. Additionally, pre-sort unit 102 may optionally also be configured to sort solid waste stream 150 into a pre-sort to mixed metal stream 152, a pre-sort to residue stream 154, and a pre-sort to sort stream 156. If pre-sort unit 102 is not configured to sort solid waste stream 150, the entire metered solid waste stream 150 is conveyed to sort unit 104 by pre-sort to sort stream 156.

Sort unit 104 receives pre-sort to sort stream 156 and is configured to sort pre-sort to sort stream 156 by the size of the solid waste within pre-sort to sort stream 156. Specifically, in the exemplary embodiment, solid waste that is above 8 inches in size is sorted into a sort to post-sort stream 158, and solid waste that is below 8 inches in size is sorted into a sort to glass separation stream 160. However, sort unit 104 may sort pre-sort to sort stream 156 based on any size that enables MSWR process 100 to operate as described herein, including, without limitation, 4, 6, 8, 10, 12, and/or greater than 12 inches. Sort unit 104 also includes a second analyzing station 504 (shown in FIG. 5) configured to analyze sort to post-sort stream 158 and a third analyzing station 506 (shown in FIG. 5) configured to analyze sort to glass separation stream 160.

Post-sort unit 106 receives sort to post-sort stream 158, a physical separation to post-sort recycle stream 162, and a SRF production to post-sort recycle stream 164 and is configured to sort the received streams. Specifically, post-sort unit 106 is configured to separate clean cardboard from the received streams and convey the clean cardboard to OOC Unit 122 by a post-sort to OOC stream 166. Post-sort unit 106 is also configured to separate two-dimensional waste from three-dimensional waste. The two-dimensional waste is further separated by weight before being conveyed to primary shredding unit 110 by a post-sort to primary shredding steam 172. The three-dimensional waste is conveyed to physical separation unit 112 by a post-sort to physical separation steam 173. Additionally, post-sort unit 106 may also optionally be configured to sort the received streams into a post-sort to mixed metal stream 168 and a post-sort to residue stream 170. Post-sort unit 106 also includes a fourth analyzing station 710 (shown in FIG. 7) configured to analyze the two-dimensional waste and a fifth analyzing station 712 (shown in FIG. 7) configured to analyze post-sort to physical separation steam 173.

Together pre-sort unit 102, sort unit 104, and post-sort unit 106 form a pre-shredding unit 198 as indicated by dashed line 198 on FIG. 1. The units of pre-shredding unit 198 are configured to remove large, bulky, or difficult to shred materials from solid waste stream 150 that may clog or otherwise impair the operation of primary shredding unit 110, increasing the downtime of the facility. As such, pre-sorting solid waste stream 150 in pre-shredding unit 198 reduces the down time of the MSWR facility by removing large, bulky, or difficult to shred materials from solid waste stream 150 and improves the economics of MSWR process 100.

Glass separation unit 108 receives sort to glass separation stream 160 and a physical separation to glass separation recycle stream 174 and is configured to sort glass from the received streams. The sorted glass is sent to sand unit 132 by a glass separation to sand stream 176, and the remaining solid waste from the received streams is conveyed to physical separation unit 112 by a glass separation to physical separation steam 178.

Primary shredding unit 110 receives post-sort to primary shredding steam 172 and is configured to shred post-sort to primary shredding steam 172. Specifically, primary shredding unit 110 is configured to shred the solid waste within post-sort to primary shredding steam 172 to below 12 inches in size. However, primary shredding unit 110 may shred the solid waste within post-sort to primary shredding steam 172 to any size that enables MSWR process 100 to operate as described herein, including, without limitation, 4, 8, 10, 14, 16, and/or greater than 16 inches. The shredded post-sort to primary shredding steam 172 is conveyed to secondary shredding unit 114 by a primary shredding to secondary shredding stream 180. Primary shredding unit 110 also includes a sixth analyzing station 1504 (shown in FIG. 15) configured to analyze primary shredding to secondary shredding stream 180.

Physical separation unit 112 receives post-sort to physical separation steam 173 and glass separation to physical separation steam 178 and is configured to sort the received streams based on the physical properties of the solid waste within the streams. For example, as will be described in greater detail below, physical separation unit 112 is configured to sort the received streams based on the magnetic properties, the density, and the shape of the solid waste within the received streams. Specifically, physical separation unit 112 is configured to: (1) sort ferrous metal from the received streams and convey the ferrous metal to ferrous metal unit 124 by a physical separation to ferrous metal steam 182; (2) sort non-ferrous metal from the received streams and convey the non-ferrous metal to non-ferrous metal unit 126 by a physical separation to non-ferrous metal steam 184; (3) sort HDPE from the received streams and convey the HDPE to HDPE unit 128 by a physical separation to HDPE steam 186; and (4) sort PET from the received streams and convey the PET to PET unit 130 by a physical separation to PET steam 188. Once the ferrous metals, non-ferrous metals, HDPE, and PET have been separated from the received streams, the remaining solid waste is: (1) conveyed to secondary shredding unit 114 by a physical separation to secondary shredding stream 190; (2) recycled back to glass separation unit 108 by physical separation to glass separation recycle stream 174; or (3) recycled back to physical separation to post-sort unit 106 by post-sort recycle stream 162. Physical separation unit 112 also includes a seventh analyzing station 1734 (shown in FIG. 17).

Secondary shredding unit 114 receives physical separation to secondary shredding stream 190 and is configured to shred physical separation to secondary shredding stream 190. Specifically, secondary shredding unit 114 is configured to shred the solid waste within physical separation to secondary shredding stream 190 to below 2 inches in size. However, secondary shredding unit 114 may shred the solid waste within post-sort to primary shredding steam 172 to any size that enables MSWR process 100 to operate as described herein, including, without limitation, 0.5, 1, 1.5, 3, 4, and/or greater than 4 inches. The shredded physical separation to secondary shredding stream 190 is conveyed to SRF production unit 116 by a secondary shredding to SRF production stream 192.

SRF production unit 116 receives secondary shredding to SRF production stream 192 and is configured to produce SRF, which is then converted into energy or other useful products. Additionally, SRF production unit 116 is the final quality control point for controlling the quality of the SRF. As such, SRF production unit 116 includes an eighth analyzing station 2202 (shown in FIG. 22) and a ninth analyzing station 2206 (shown in FIG. 22) which control the flow of SRF out of MSWR process 100 based, in part, on the specific energy of the produced SRF. Eighth analyzing station 2202 and ninth analyzing station 2206 may also control the entire MSWR process 100 to ensure that the produced SRF meets the requirements of International Standards. Additionally, if Eighth analyzing station 2202 and/or ninth analyzing station 2206 determines that the produced SRF does not meet the requirements set by International Standards or greatly exceeds those requirements such that the produced SRF reduces the economics of MSWR process 100, the produced SRF is recycled back to post-sort unit 106 by SRF production to post-sort recycle stream 164.

Material streams 150-192 are configured to convey solid waste from one unit operation to another unit operation. In the exemplary embodiment, material streams 150-192 all include a conveyor configured to convey solid waste, unless otherwise specified herein. However, material streams 150-192 may include any device configured to convey solid waste that enables MSWR process 100 to operate as described herein.

Figure 2:
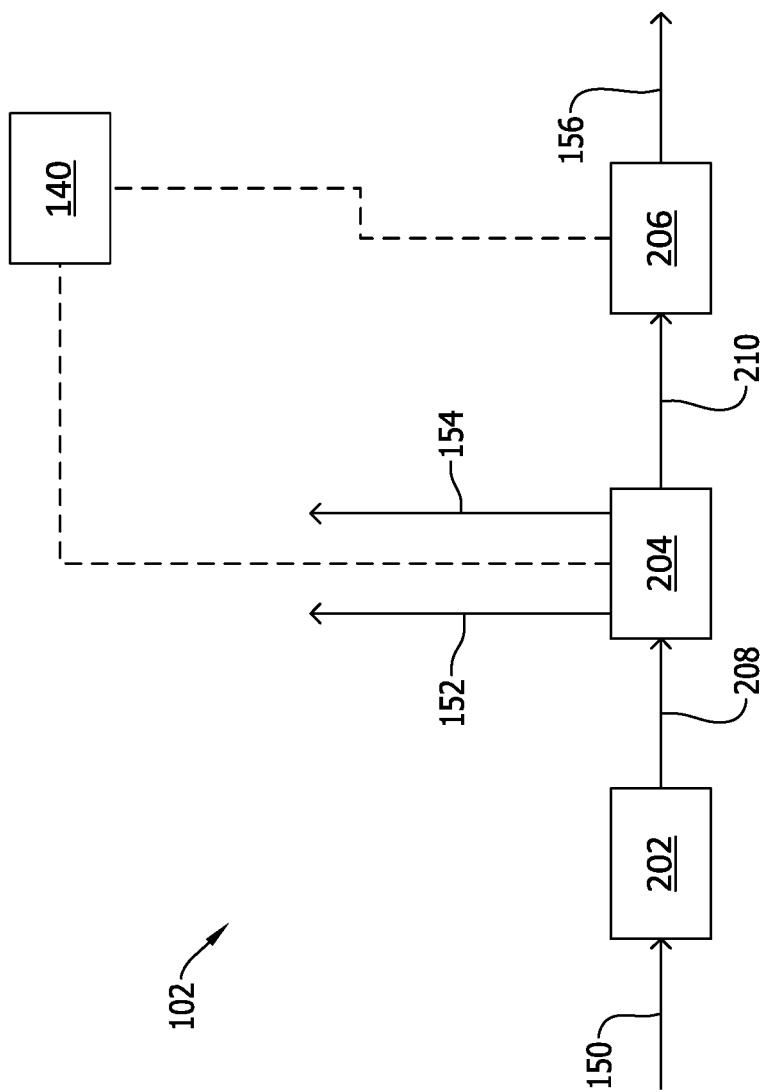
FIG. 2 is a block flow diagram of an exemplary pre-sort unit within the Municipal Solid Waste Recycling Process shown in FIG. 1.

FIG. 2 is a block flow diagram of pre-sort unit 102. In the exemplary embodiment, pre-sort unit 102 includes an excavator 202, a drum feeder 204, and a first analyzing station 206. Excavator 202 is configured to transfer solid waste from solid waste stream 150 from solid waste pits (not shown) into drum feeder 204. Specifically, excavator 202 is configured to lift solid waste from solid waste stream 150 from solid waste depository (not shown) into drum feeder 204 by an excavator to drum feeder stream 208. In the exemplary embodiment, excavator 202 is a hydraulic excavator. However, excavator 202 may be any type of transport device configured to transport MSW. Drum feeder 204 is configured to meter or control the flow of solid waste from solid waste stream 150 into MSWR process 100. Additionally, drum feeder 204 may optionally be configured to separate the metered flow from drum feeder 204 is conveyed to first analyzing station 206 by a drum feeder to first analyzing stream 210. First analyzing station 206 analyzes drum feeder to first analyzing stream 210 to determine, at least in part, the specific energy and/or a density of drum feeder to first analyzing stream 210. The collected data is sent to control unit 140, and control unit 140 controls drum feeder, in part, based on the data collected by first analyzing station 206. Additionally, the data collected by first analyzing station 206 is used to control downstream units within MSWR process 100.

During operations, municipal solid waste is collected and delivered to a solid waste depository (not shown). Excavator 202 lifts the solid waste within solid waste stream 150 into drum feeder 204. Drum feeder 204 meters solid waste stream 150 into MSWR process 100 based on controls from control unit 140. Drum feeder 204 then conveys drum feeder to first analyzing stream 208 to first analyzing station 206. First analyzing station 206 analyzes drum feeder to first analyzing stream 210 and sends the collected data to control unit 140. Control unit 140 controls drum feeder 204 based, at least in part, on the collected data from analyzing stations 206, 504, 506, 710, 712, 1504, 1734, 2202, and 2206. Additionally, control unit 140 may control MSWR process 100 based, at least in part, on the collected data from first analyzing station 206. For example, if the density of drum feeder to first analyzing stream 210 is outside a predetermined density range, control unit 140 may control MSWR process 100 to increase/decrease the density of downstream material streams. Accordingly, first analyzing station 206 ensures that the final SRF product has a density within the predetermined density range.

Figure 3:
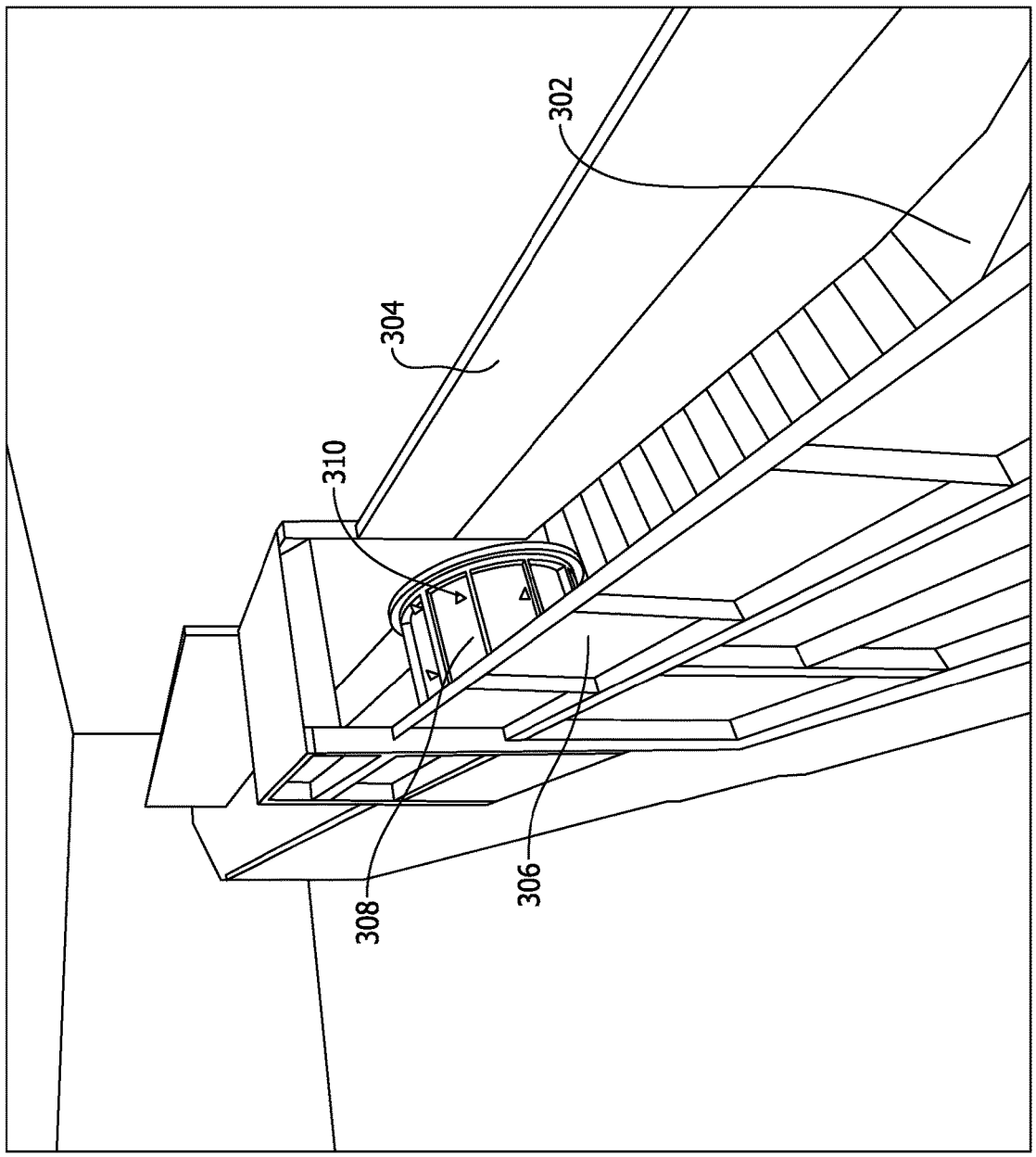
FIG. 3 is a perspective view of an exemplary drum feeder for use with the pre-sort unit shown in FIG. 2.

FIG. 3 is a perspective view of drum feeder 204 including a transport device 302, a first side plate 304, a second side plate 306, and a metering wheel 308. In the exemplary embodiment, transport device 302 is a conveyor belt. However, transport device 302 may be any device that enables drum feeder 204 to operate as described herein. Metering wheel 308 includes a plurality of protrusions or spikes 310 positioned on an outer circumference of metering wheel 308 and are configured to rip open trash bags within solid waste stream 150. Metering wheel 308 is rotatably coupled to first side plate 304 and second side plate 306 such that metering wheel 308 is adjustably positioned a height above transport device 302. Control unit 140 is configured to adjust the height of metering wheel 308 based, at least in part, on data collected by first analyzing station 206. During operations, if the specific energy of drum feeder to first analyzing stream 210 greatly exceeds the predetermined specific energy value, control unit 140 reduces the height of metering wheel 308 such that the flow rate and the specific energy of solid waste stream 150 is decreased to within the predetermined specific energy range. Conversely, if the specific energy of drum feeder to first analyzing stream 210 does not meet or exceed the predetermined specific energy value, control unit 140 increases the height of metering wheel 308 such that the flow rate and the specific energy of solid waste stream 150 is increased to within the predetermined specific energy range.

Figure 4:
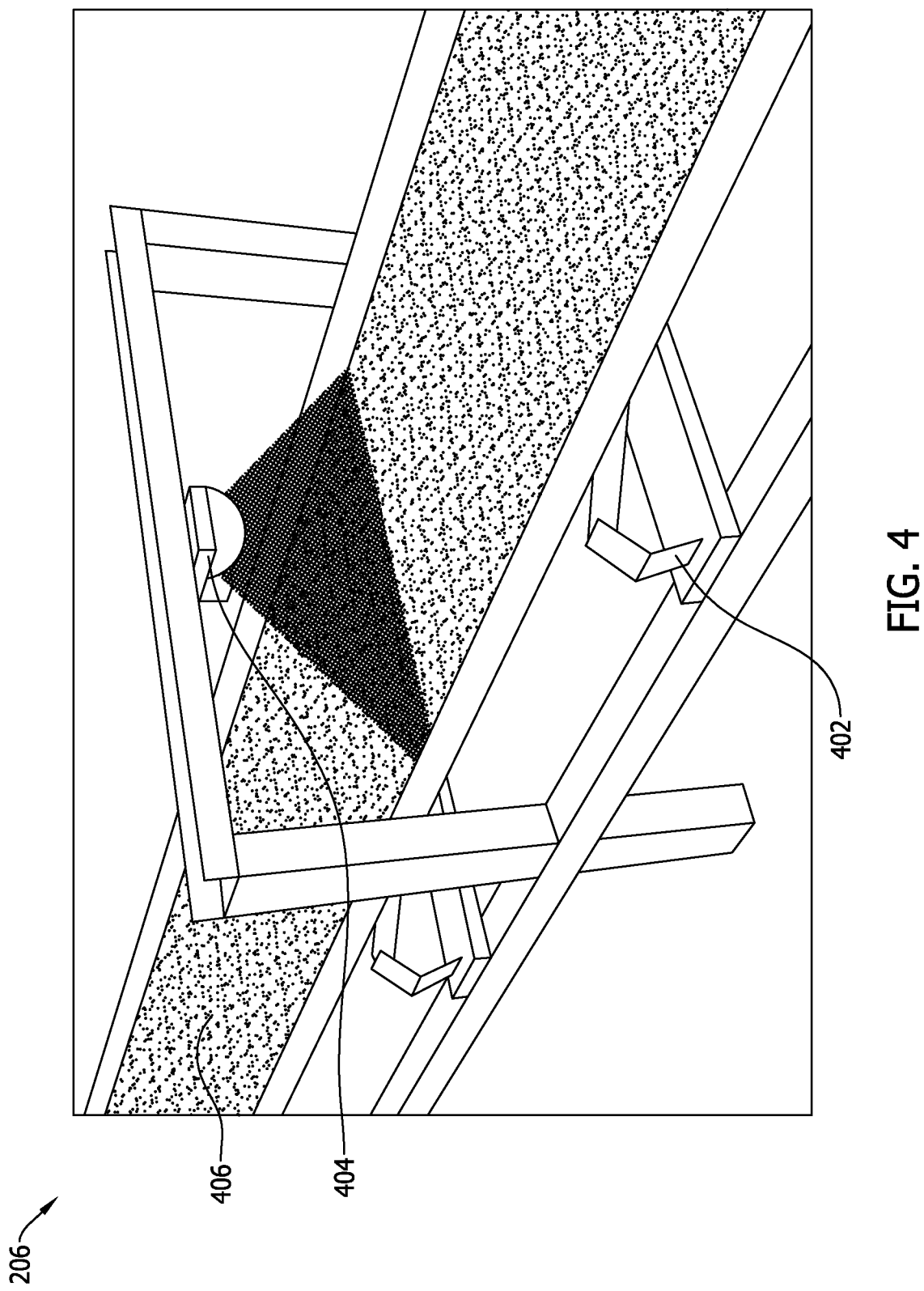
FIG. 4 is a perspective view of an exemplary first analyzing station for use with the pre-sort unit shown in FIG. 2.

FIG. 4 is a perspective view of first analyzing station 206 including a belt scale 402 and an optical scanner 404. In the exemplary embodiment, belt scale 402 is configured to measure total weight, belt load, flow rate, and speed of solid waste. Optical scanner 404 may include a visible light optical scanner and/or an infrared optical scanner and is configured to measure the distance from drum feeder to first analyzing stream 210 on a conveyor belt 406 using the "lights time-of-flight" principle. As such, optical scanner 404 measures burden depth and through put volume of drum feeder to first analyzing stream 210. First analyzing station 206 also includes a moisture sensor (not shown) configured to measure the moisture content of drum feeder to first analyzing stream 210. Together belt scale 402, optical scanner 404, and the moisture sensor can directly measure and/or determine the specific energy and moisture content of drum feeder to first analyzing stream 210. First analyzing station 206 then sends the collected data to control unit 140.

Figure 5:
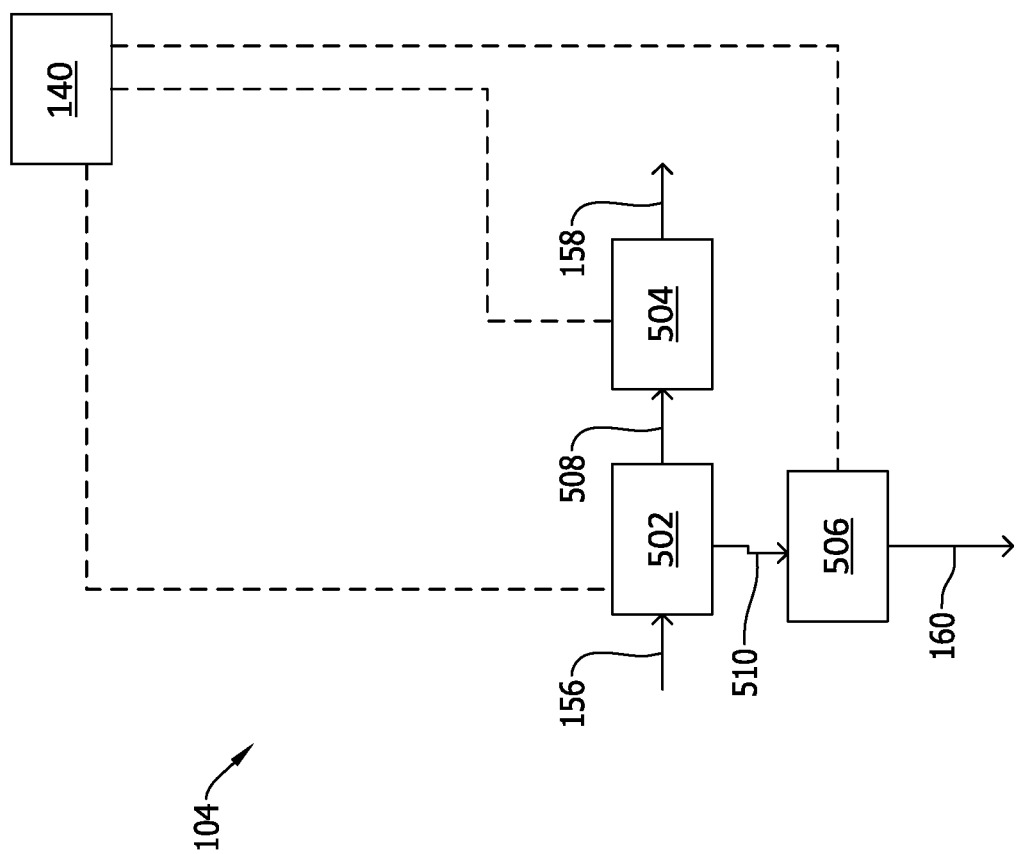
FIG. 5 is a block flow diagram of an exemplary sort unit within the Municipal Solid Waste Recycling Process shown in FIG. 1.

FIG. 5 is a block flow diagram of sort unit 104. Sort unit 104 includes a trommel 502, a second analyzing station 504, and a third analyzing station 506. Trommel 502 receives pre-sort to sort stream 156 and is configured to sort pre-sort to sort stream 156 by the size of the solid waste within pre-sort to sort stream 156. Specifically, in the exemplary embodiment, solid waste that is above 8 inches in size is sorted into a trommel to second analyzing station stream 508 by trommel 502, and solid waste that is below 8 inches in size is sorted into a trommel to third analyzing station stream 510 by trommel 502. However, trommel 502 may sort pre-sort to sort stream 156 based on any size that enables MSWR process 100 to operate as described herein, including, without limitation, 4, 8, 10, 12, and/or greater than 12 inches. Second analyzing station 504 is configured to receive trommel to second analyzing station stream 508 and to analyze trommel to second analyzing station stream 508. Third analyzing station 506 is configured to receive trommel to third analyzing station stream 510 and to analyze trommel to third analyzing station stream 510. Second analyzing station 504 and third analyzing station 506 are substantially similar to first analyzing station 206 (shown in FIG. 2) except second analyzing station 504 and third analyzing station 506 do not control any equipment. Rather, second analyzing station 504 and third analyzing station 506 send collected data to control unit 140, similar to first analyzing station 206, and control unit 140 uses the collected data to control MSWR process 100. Accordingly, second analyzing station 504 and third analyzing station 506 are configured to be a passive data collection station rather than an active control station. Additionally, control unit 140 may control trommel 502. Second analyzing station 504 conveys trommel to second analyzing station stream 508 to post-sort unit 106 (shown in FIG. 1) by sort to post-sort stream 158, and third analyzing station 506 conveys trommel to third analyzing station stream 510 to glass separation unit 108 (shown in FIG. 1) by sort to glass separation stream 160.

Figure 6:
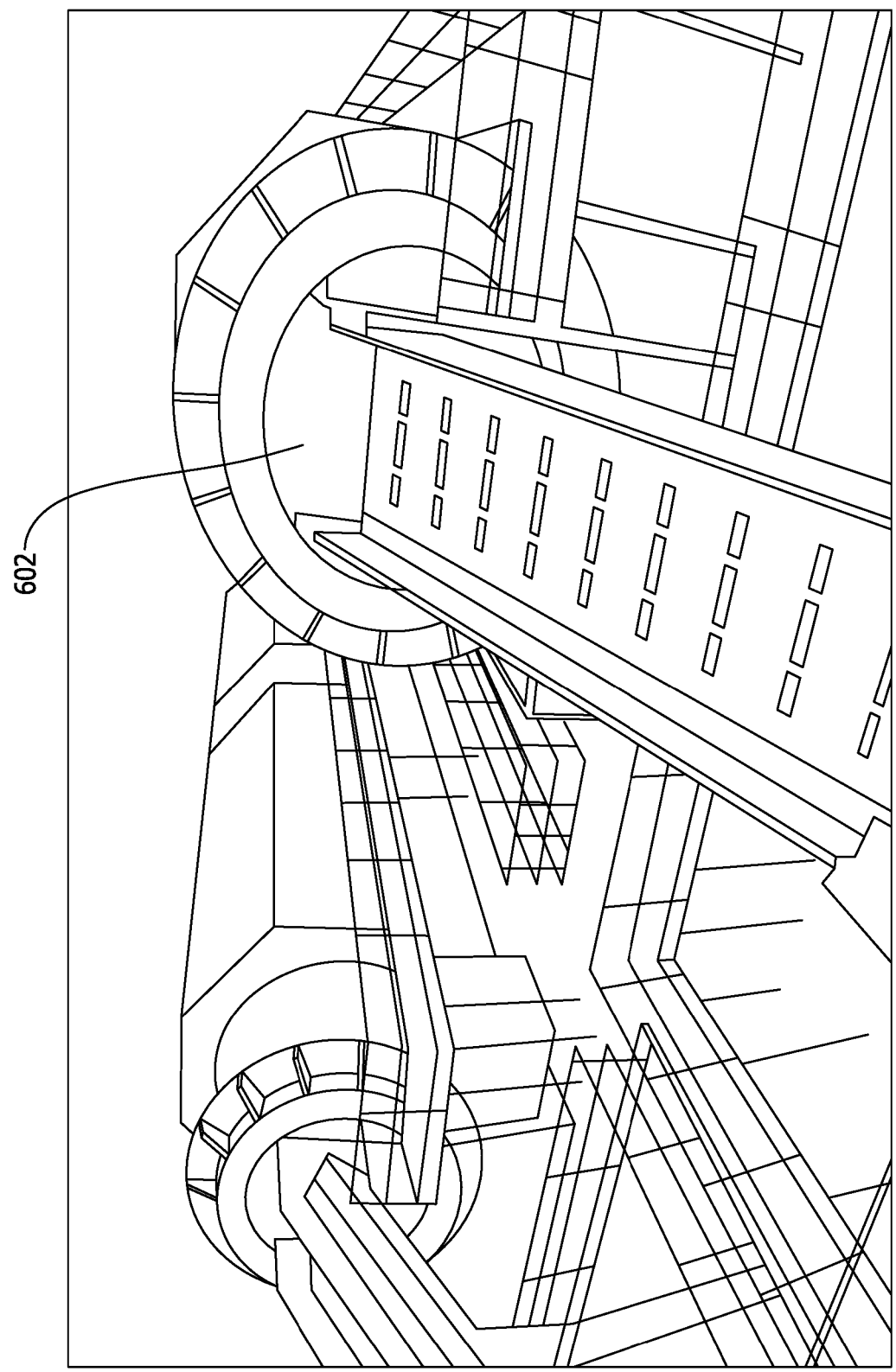
FIG. 6 is a perspective view of an exemplary trommel for use with the sort unit shown in FIG. 5.

FIG. 6 is a perspective view of trommel 502 including an inclined, rotating mechanical screen 602 configured to separate pre-sort to sort stream 156 by size. Mechanical screen 602 includes a plurality of opening (not shown) configured to allow solid waste within pre-sort to sort stream 156. Specifically, in the exemplary embodiment, mechanical screen 602 is 40 feet long and includes a plurality of first openings (not shown) and a plurality of second openings (not shown). The first 20 feet of mechanical screen 602 include the first openings while the second 20 feet of mechanical screen 602 include the second openings. The first openings are configured to allow solid waste particles that are below 5 inches to fall to a first conveyor (not shown), and the second openings are configured to allow solid waste particles that are below 8 inches to fall to a second conveyor (not shown). The first and second conveyors are both part of trommel to third analyzing station stream 510. Trommel to third analyzing station stream 510 is conveyed on separate conveyors because the volume of municipal solid waste may be too high for a single third analyzing station 506 and other downstream equipment in glass separation unit 108. Mechanical screen 602 may also include a plurality of protrusions configured to rip open trash bags within pre-sort to sort stream 156. During operations, pre-sort to sort stream 156 enters mechanical screen 602 while mechanical screen 602 is rotating. Smaller solid waste particles fall through the openings to trommel to third analyzing station stream 510 while larger solid waste particles exit mechanical screen 602 are conveyed to trommel to second analyzing station stream 508. Control unit 140 may control trommel 502 by controlling the rate of rotation of mechanical screen 602 and/or setting an angle of inclination of mechanical screen 602. Specifically, control unit 140 may control trommel 502 based on the density of pre-sort to sort stream 156 measured by first analyzing station 206 by increasing the rotational speed of trommel 502 if the density is too high and decreasing the rotational speed of trommel 502 if the density is too low. Generally, increasing the density of trommel to second analyzing station stream 508 increases the specific energy of the final SRF product while decreasing the density of trommel to second analyzing station stream 508 decreases the specific energy of the final SRF product. Accordingly, control unit 140 may control the specific energy of the final SRF product, at least in part, by controlling the rotational speed of trommel 502.

Figure 7:
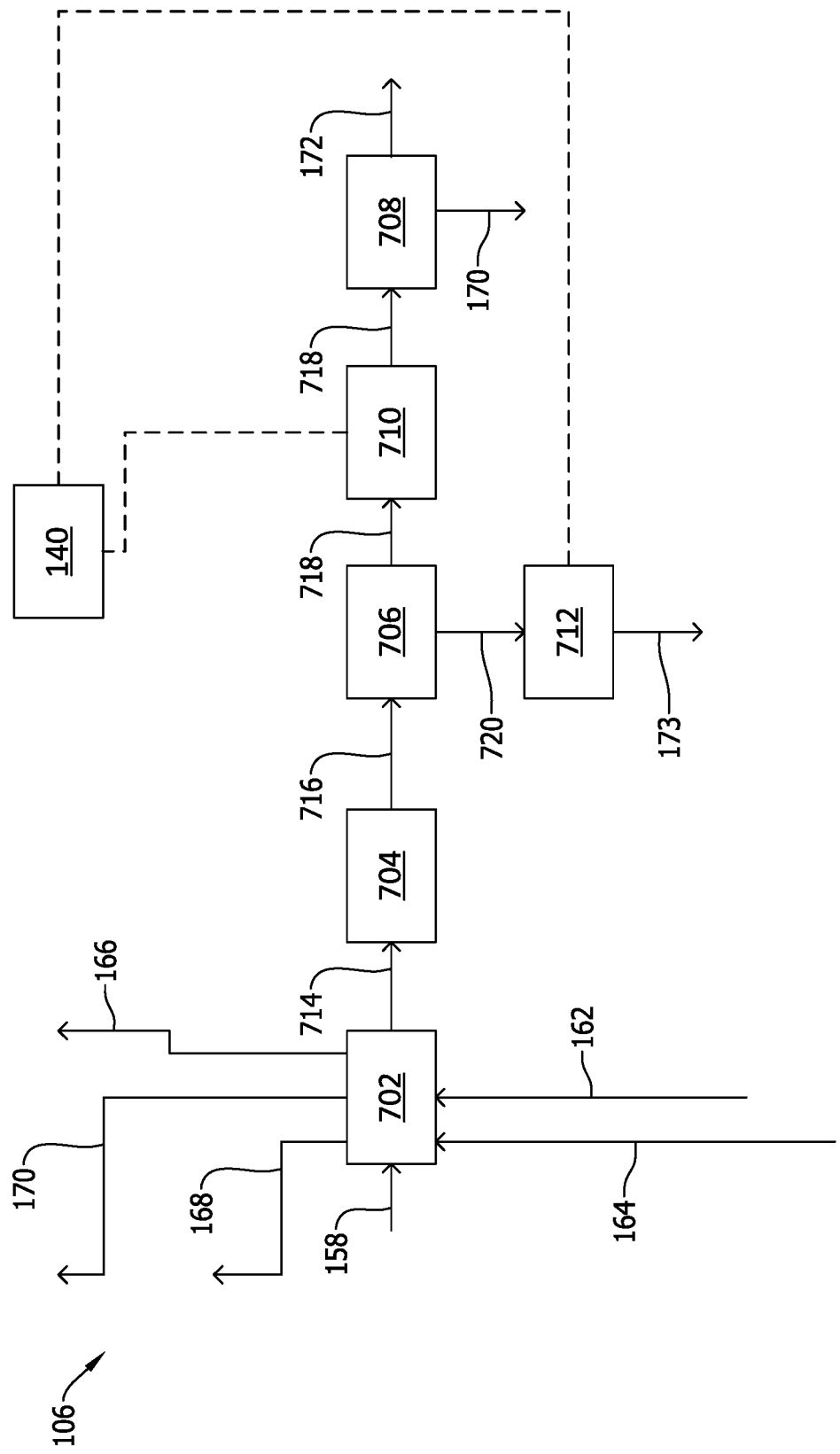
FIG. 7 is a block flow diagram of an exemplary post-sort unit within the Municipal Solid Waste Recycling Process shown in FIG. 1.

FIG. 7 is a block flow diagram of post-sort unit 106. Post-sort unit 106 is configured to receive sort to post-sort stream 158 and includes a post-sort station 702, an auger unit 704, an auger screen 706, a heavy/light separator 708, a fourth analyzing station 710, and a fifth analyzing station 712. Post-sort station 702 is a manual sorting station positioned immediately down stream of trommel 502 and configured to allow a plurality of operators (not shown) to manually remove large solid waste items, such as bulky plastic and bulky metals, within sort to post-sort stream 158 to prevent the large items from jamming primary shredding unit 110. Post-sort station 702 conveys the sorted sort to post-sort stream 158 to auger unit 704 by a post-sort station to auger unit stream 714. Auger unit 704 conveys the sorted post-sort station to auger unit stream 714 to auger screen 706 by an auger unit to auger screen stream 716. Auger screen 706 receives auger unit to auger screen stream 716 and is configured to sort auger unit to auger screen stream 716 by size. Specifically, auger screen 706 separates two-dimensional waste from three-dimensional waste to create a two-dimensional waste stream 718 and post-sort to a three-dimensional waste stream 720. Fourth analyzing station 710 is configured to receive and analyze two-dimensional waste stream 718, and fifth analyzing station 712 is configured to receive and analyze three-dimensional waste stream 720. Fourth analyzing station 710 and fifth analyzing station 712 are passive analyzers that collect data, but do not directly control MSWR process 100. Two-dimensional waste stream 718 is configured to convey sorted solid waste to heavy/light separator 708 and post-sort to physical separation steam 173 is configured to convey solid waste to physical separation unit 112. Heavy/light separator 708 is configured to separate two-dimensional waste stream 718 by weight. Specifically, the heavier solid waste particles are conveyed to residue unit 120 (shown in FIG. 1) by post-sort to residue stream 170 and the lighter solid waste particles are conveyed to primary shredding unit 110 (shown in FIG. 1) by post-sort to primary shredding steam 172.

Figure 8:
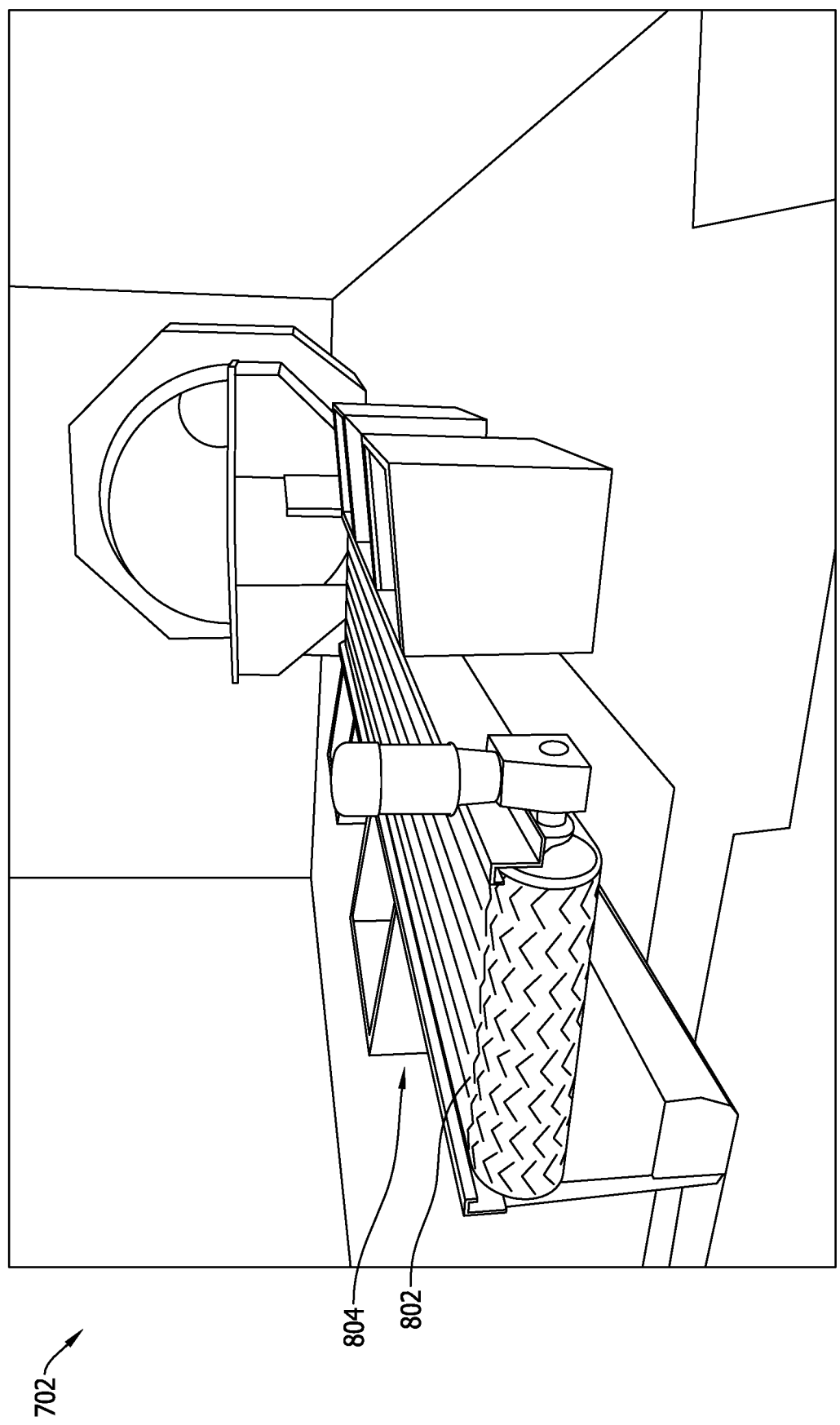
FIG. 8 is a perspective view of an exemplary post-sort station for use with the post-sort unit shown in FIG. 7.

FIG. 8 is a perspective view of post-sort station 702 including a conveyor 802 and a plurality of work stations 804 positioned proximate conveyor 802. A plurality of operators (not shown) are positioned within work stations 804 and manually remove large solid waste items, such as bulky plastic and bulky metals, within sort to post-sort stream 158 to prevent the large items from jamming primary shredding unit 110.

Figure 9:
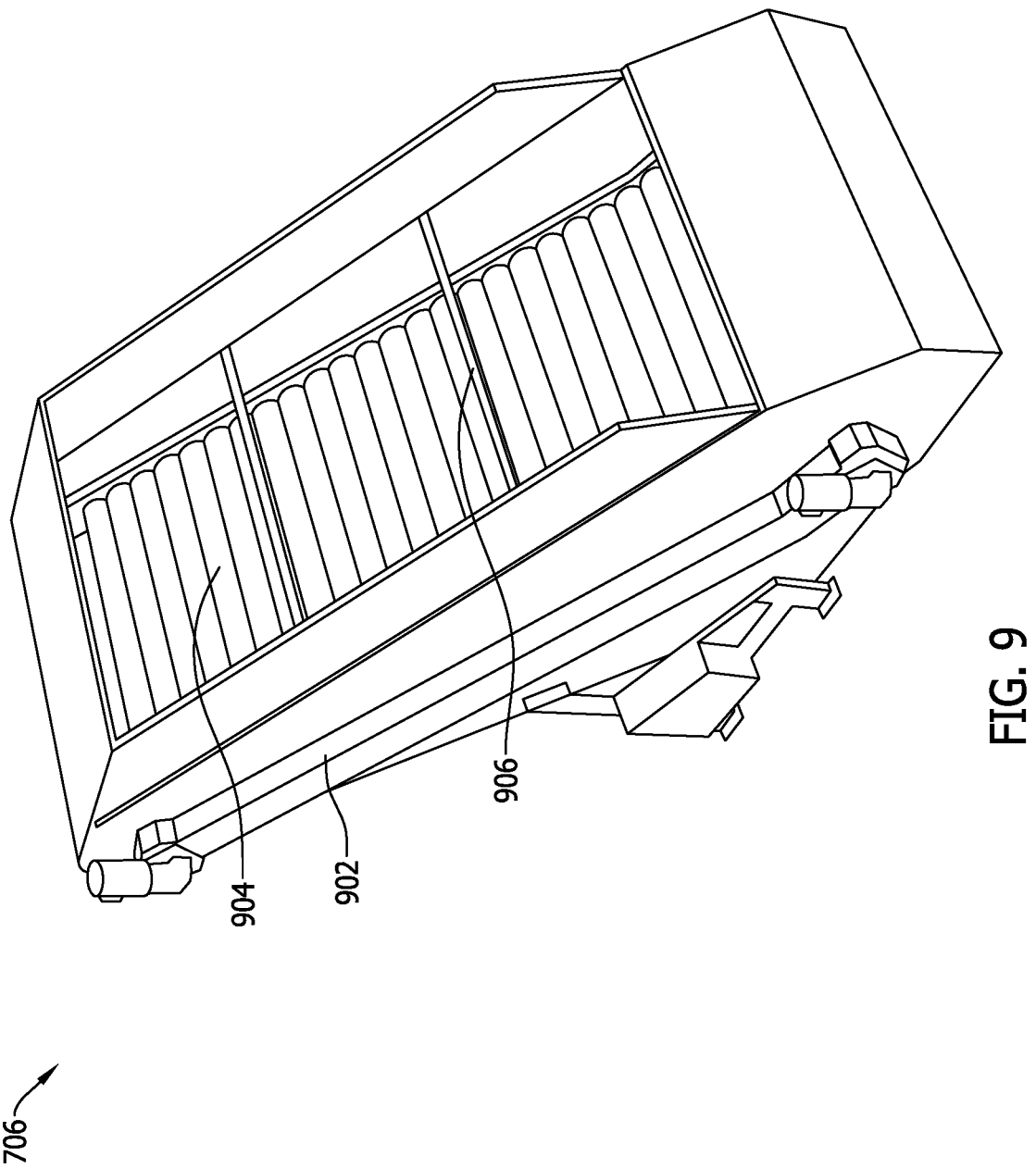
FIG. 9 is a perspective view of an exemplary auger screen for use with the post-sort unit shown in FIG. 7.

FIG. 9 is a perspective view of auger screen 706 including a frame 902 and a plurality of augers 904 positioned within frame 902. A plurality of shelves 906 are coupled to frame 902 and positioned above augers 904. Frame 902 is typically angled relative to a horizontal position such that some solid waste material falls backward rather than going over auger screen 706. Additionally, shelves 906 are positioned a distance above augers 904 such that only flat or two-dimensional material passes over auger screen 706. During operations, augers 904 rotate drawing solid waste up auger screen 706. Three-dimensional material is prevented from going over auger screen 706 by shelves 906. The amount of three-dimensional material that is allowed to go over auger screen 706 may be adjusted by adjusting the angle of auger screen 706. A small angle allows more three-dimensional material to pass over auger screen 706 while a larger angle allows less three-dimensional material to pass over auger screen 706.

Figure 10:
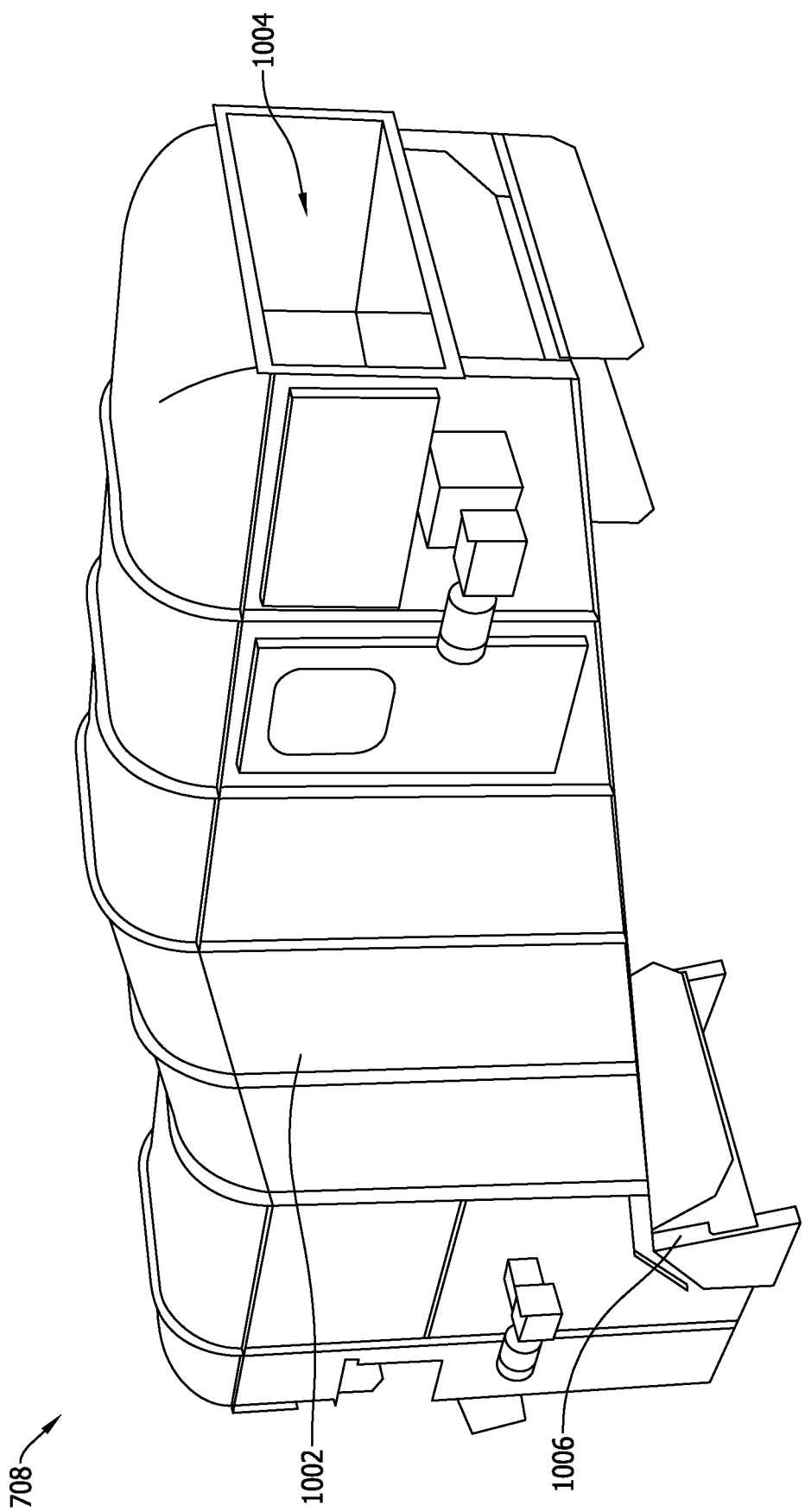
FIG. 10 is a perspective view of an exemplary heavy/light separator for use with the post-sort unit shown in FIG. 7.

FIG. 10 is a perspective view of heavy/light separator 708 including a shell 1002 defining a chamber 1004 and at least one compressor 1006. Chamber 1004 receives two-dimensional waste stream 718 and compressor 1006 is configured to channel a flow of compressed air into chamber 1004. The flow of compressed air directs lighter solid waste particles upward toward a lights exit (not shown) and allows heavier solid waste particles to fall to a heavies exit (not shown).

Figure 11:
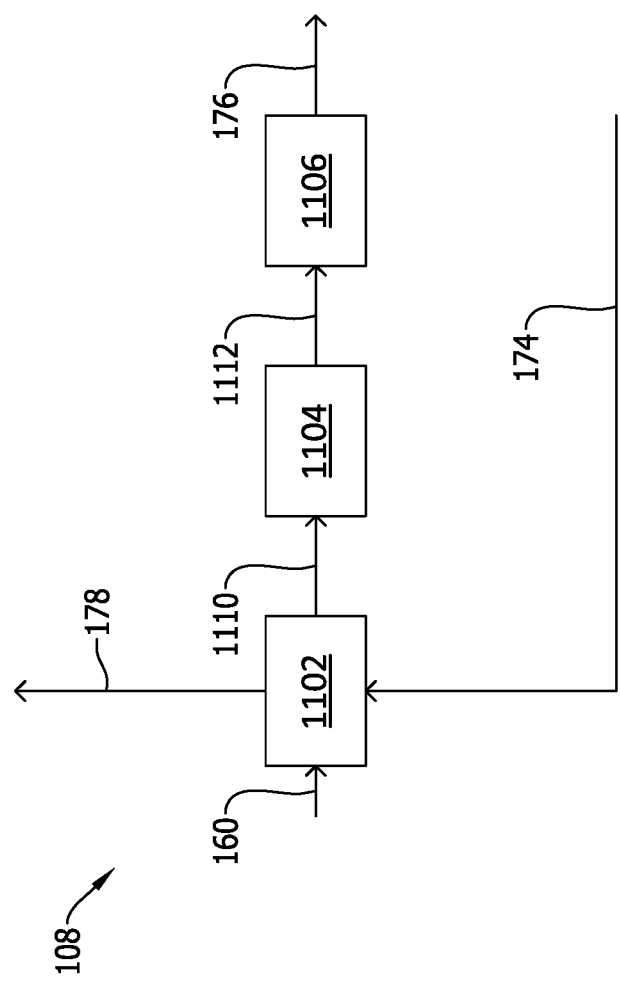
FIG. 11 is a block flow diagram of an exemplary glass separation unit within the Municipal Solid Waste Recycling Process shown in FIG. 1.

FIG. 11 is a block flow diagram of glass separation unit 108. Glass separation unit 108 receives sort to glass separation stream 160 and physical separation to glass separation recycle stream 174. Glass separation unit 108 includes a glass breaking screen 1102, a drum magnet 1104, and an eddy current separator 1106. Glass breaking screen 1102 breaks glass within the received streams and separates the received streams based on size. Smaller solid waste particles fall through glass breaking screen 1102, and larger solid waste particles, that do not include glass, are conveyed to physical separation unit 112 by glass separation to physical separation steam 178. The smaller solid waste particles are conveyed to drum magnet 1104 by a glass breaking screen to drum magnet stream 1110. Drum magnet 1104 removes ferrous metals from glass breaking screen to drum magnet stream 1110 and conveys the non-ferrous solid waste to eddy current separator 1106 by a drum magnet to eddy current separator stream 1112. Eddy current separator 1106 removes non-ferrous metals from drum magnet to eddy current separator stream 1112 and conveys drum magnet to eddy current separator stream 1112 to sand unit 132 (shown in FIG. 1) by glass separation to sand stream 176. Optionally, glass separation unit 108 may also include one or more optional unit operations. Specifically, glass separation unit 108 may also include a plurality of optical sorters (not shown), a glass crusher (not shown), and/or a kinetic pulverizer (not shown) The optical sorts are substantially similar to optical sorters 1706, 1708, 1710, and 1712 and are configured to further sort glass separation to physical separation steam 178 prior to conveying glass separation to physical separation steam 178 to physical separation unit 112. Glass crusher is configured to crush glass separation to sand stream 176 prior to conveying glass separation to sand stream 176 to sand unit 132. The kinetic pulverizer is configured to crush glass within glass separation to sand stream 176 prior to conveying glass separation to sand stream 176 to sand unit 132. Specifically, kinetic pulverizer includes a plurality of pads configured to rotate glass separation to sand stream 176 into a vortex. The material within glass separation to sand stream 176 collides with itself, and those collisions reduce the size of the material.

Figure 12:
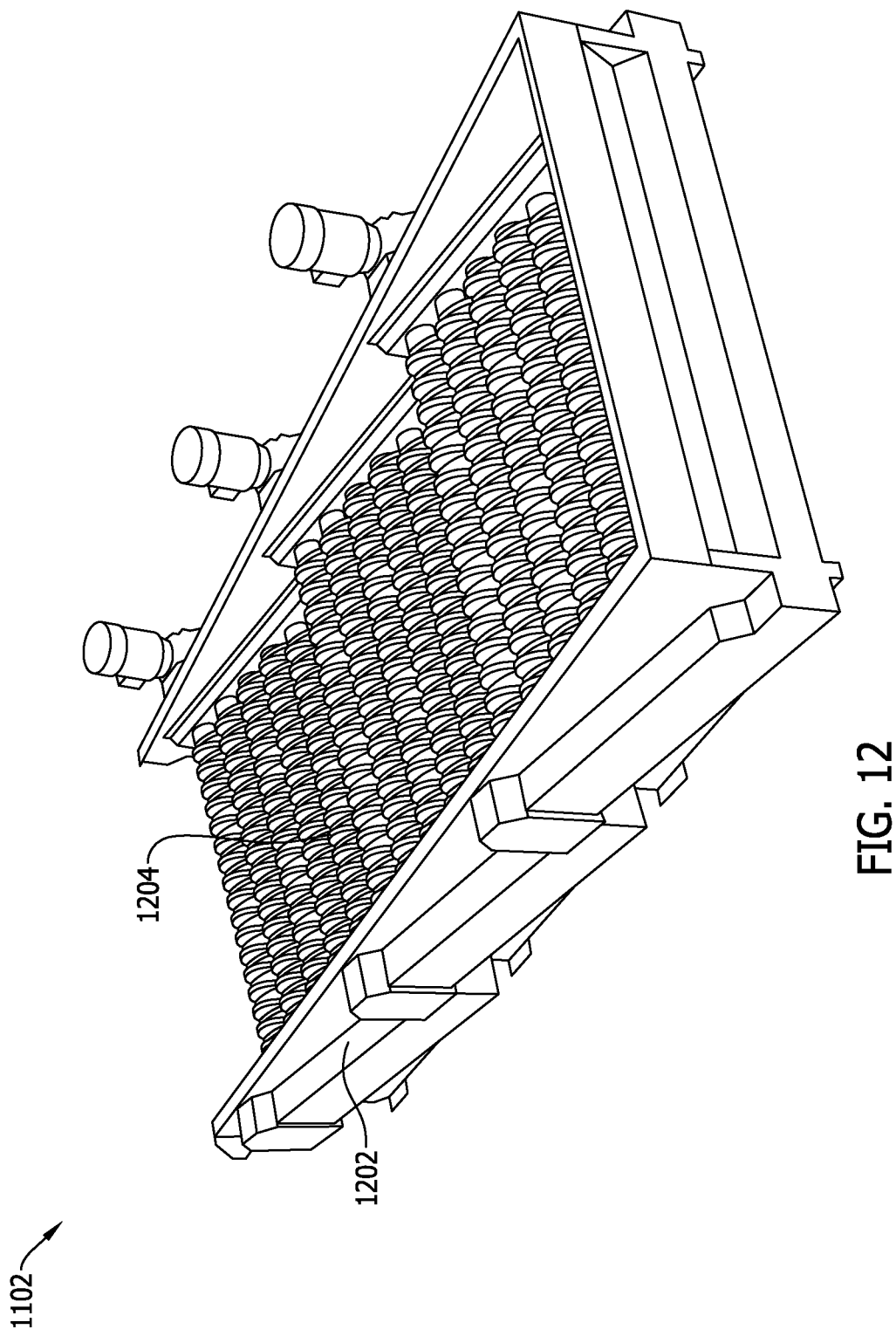
FIG. 12 is a perspective view of an exemplary glass breaking screen for use with the glass separation unit shown in FIG. 11.

FIG. 12 is a perspective view of glass breaking screen 1102 including a frame 1202 and a plurality of augers 1204 positioned within frame 1202. Solid waste is conveyed onto augers 1204, and augers 1204 break glass within the solid waste such that the glass, and other smaller solid waste particles fall between augers 1204.

Figure 13:
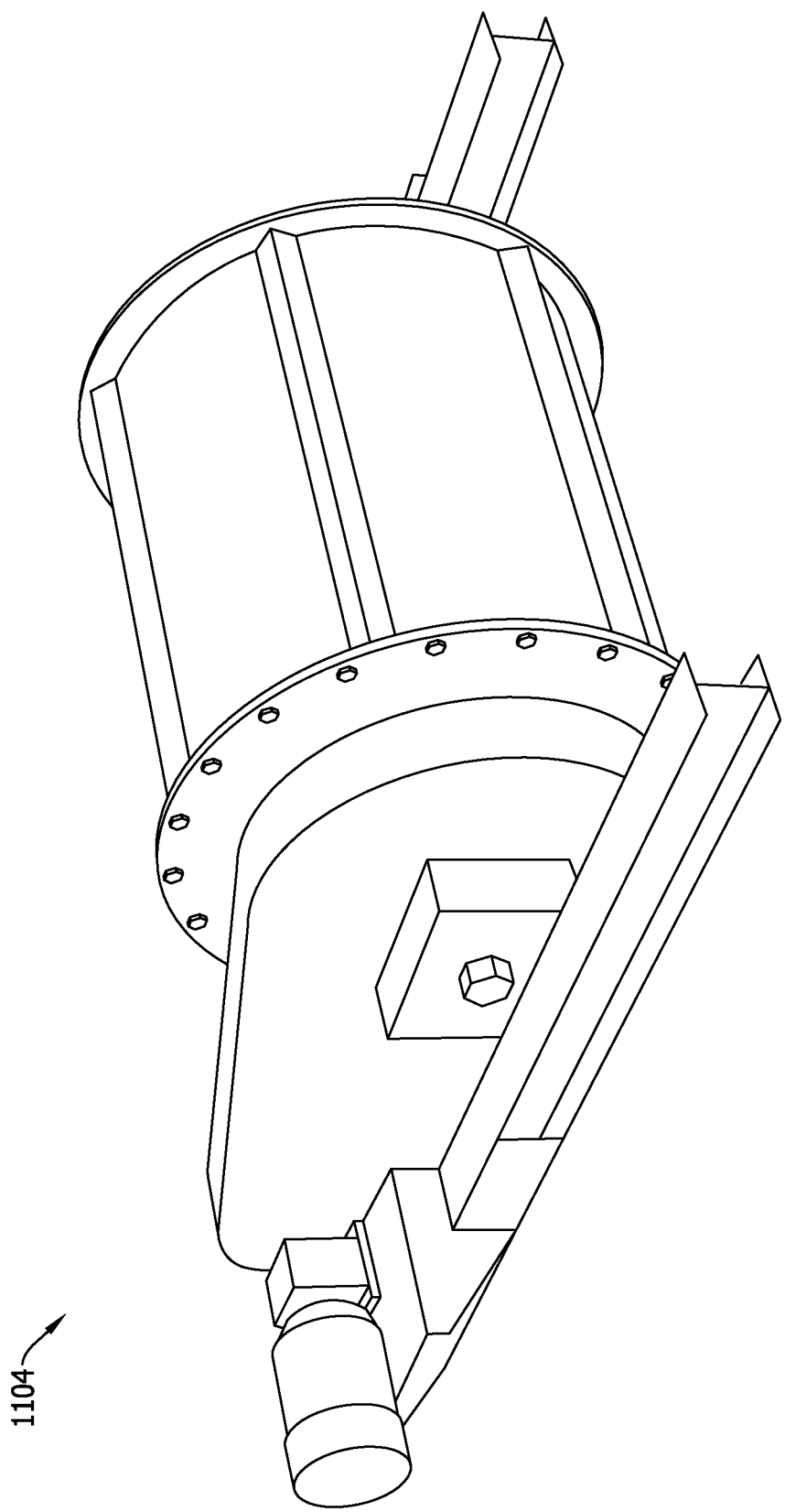
FIG. 13 is a perspective view of an exemplary drum magnet for use with the glass separation unit shown in FIG. 11.

FIG. 13 is a perspective view of drum magnet 1104 including a first magnet (not shown) and a second magnet (not shown) configured to remove ferrous metals from a solid waste stream. Specifically, in the exemplary embodiment, the first magnet is a rare earth drum magnet and the second magnet is a high gauss magnet. The first magnet is configured to remove rare earth metals, and the second magnet is configured to remove stainless steel.

Figure 14:
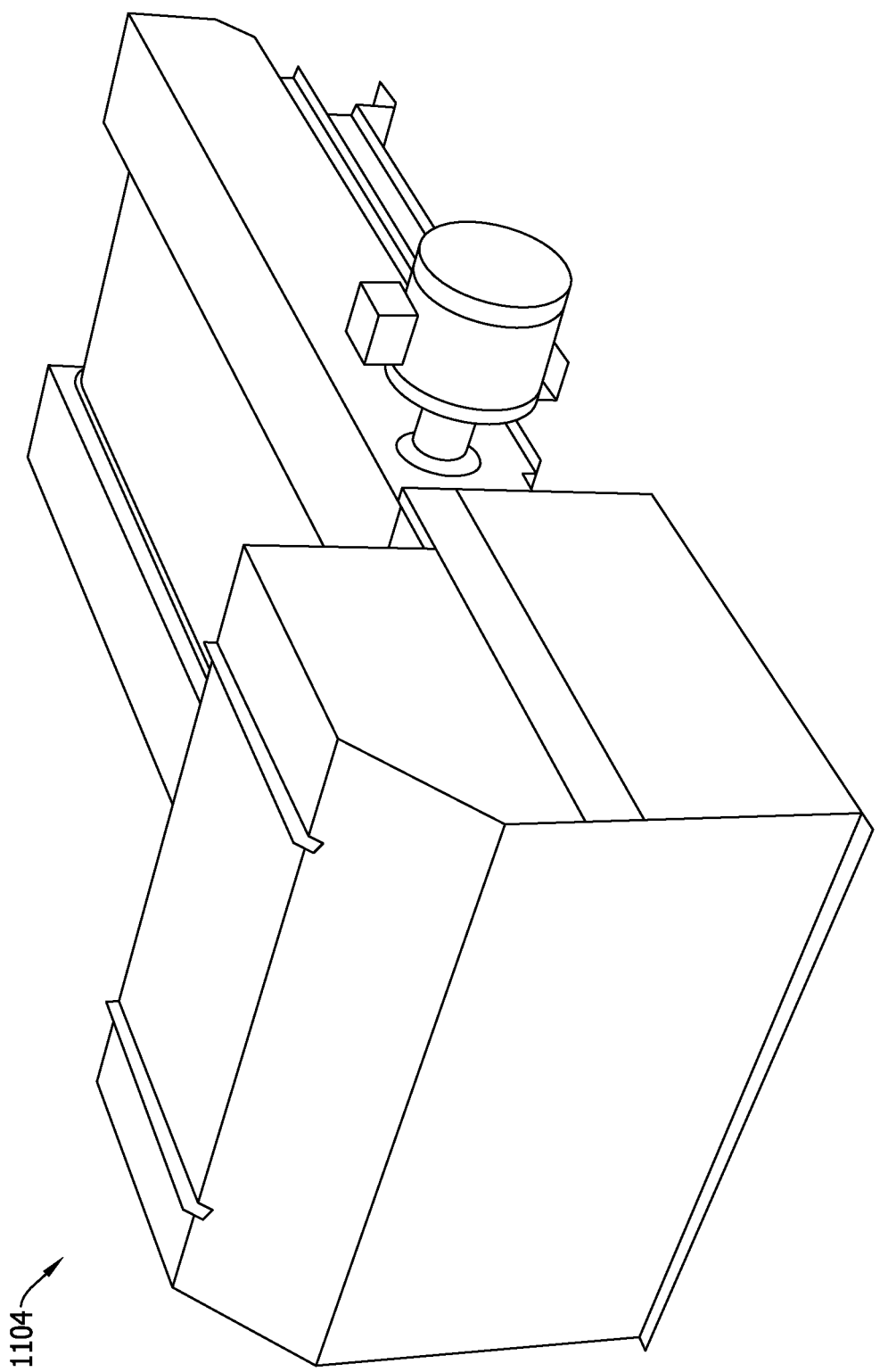
FIG. 14 is a perspective view of an exemplary eddy current separator for use with the glass separation unit shown in FIG. 11.

FIG. 14 is a perspective view of eddy current separator 1106 including a third magnet (not shown), more powerful than the first and second magnets in drum magnet 1104, configured to separate non-ferrous metals from a solid waste stream.

Figure 15:
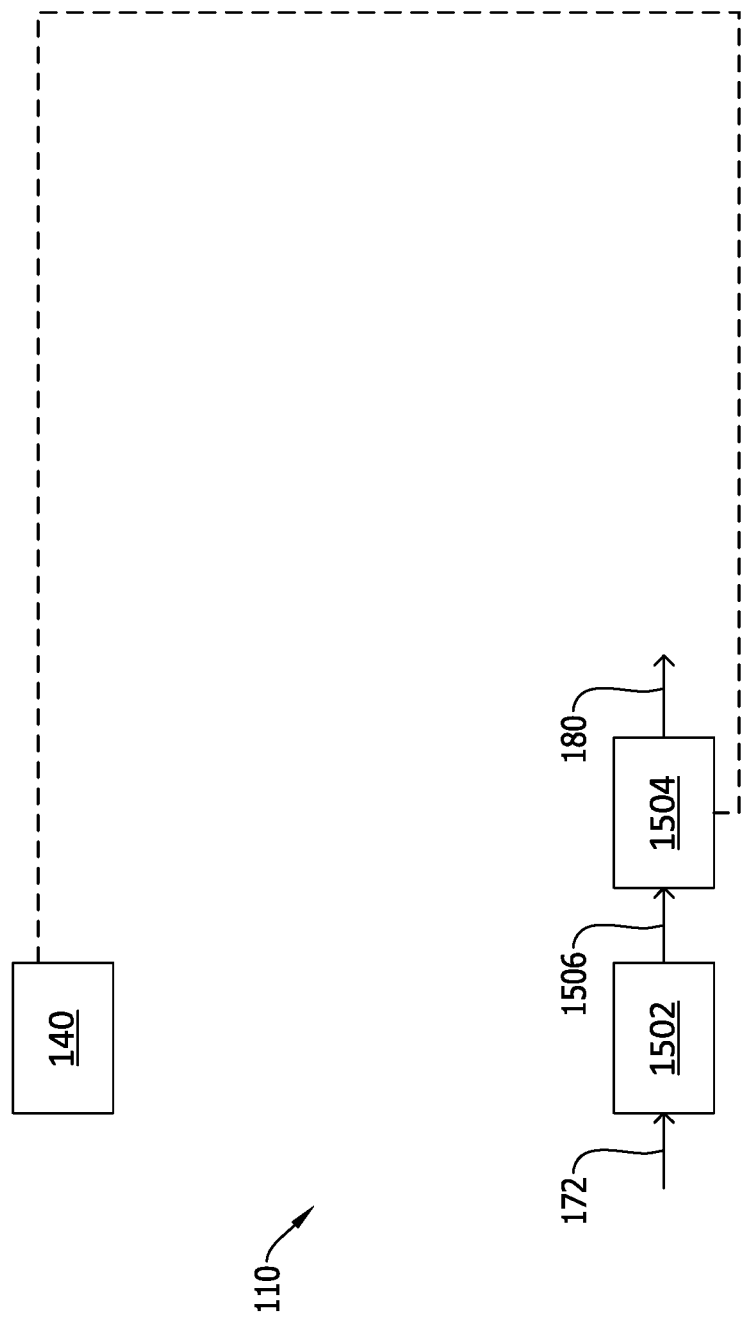
FIG. 15 is a block flow diagram of an exemplary primary shredding unit within the Municipal Solid Waste Recycling Process shown in FIG. 1.

FIG. 15 is a block flow diagram of primary shredding unit 110. Primary shredding unit 110 receives post-sort to primary shredding steam 172 and includes a primary shredder 1502 and a sixth analyzing station 1504. Primary shredder 1502 is configured to shred post-sort to primary shredding steam 172 and convey the shredded solid waste to sixth analyzing station 1504 by a primary shredder to sixth analyzing station stream 1506. Sixth analyzing station 1504 analyzes primary shredder to sixth analyzing station stream 1506 and conveys the solid waste to secondary shredding unit 114 (shown in FIG. 1) by primary shredding to secondary shredding stream 180.

Figure 16:
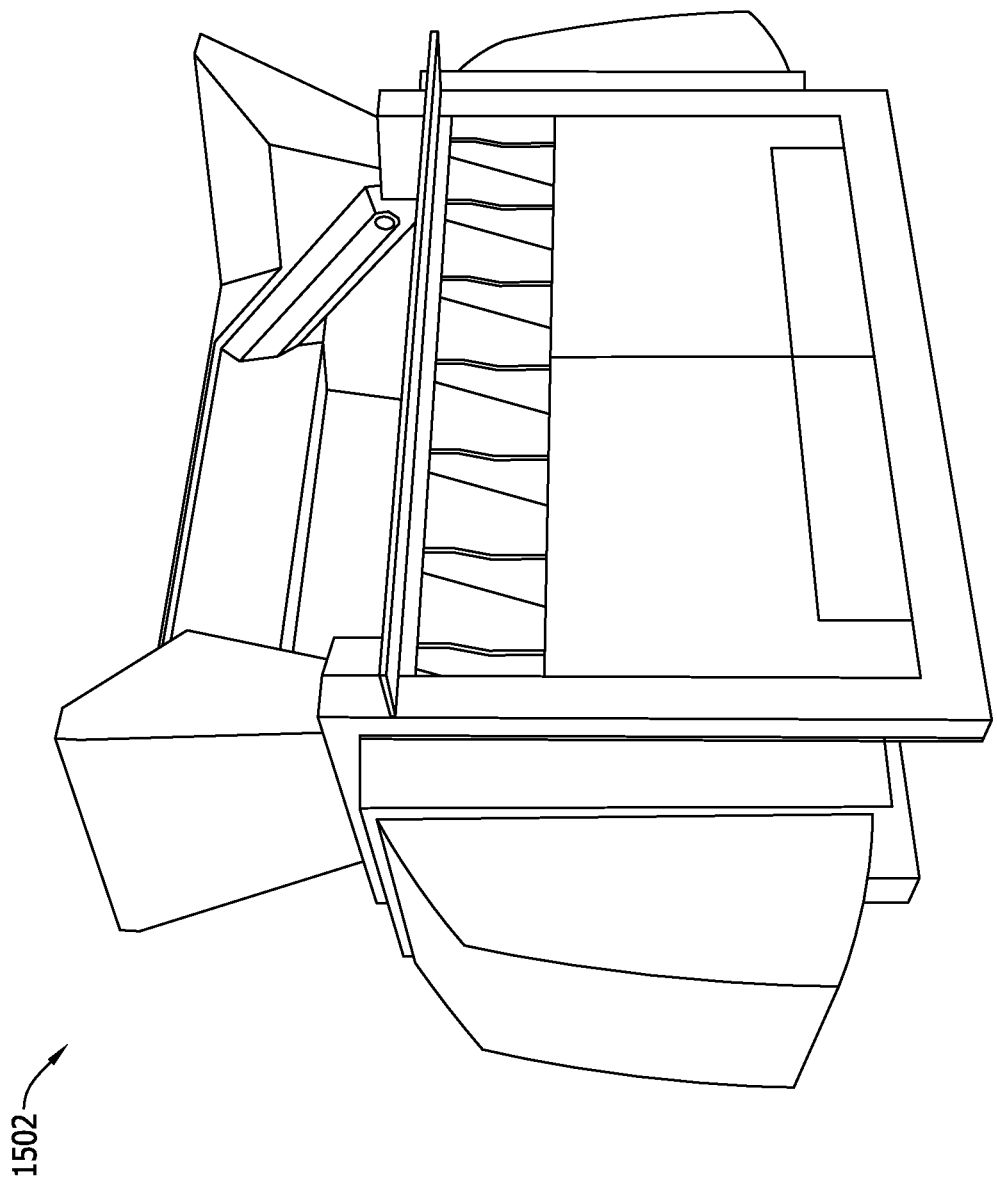
FIG. 16 is a perspective view of an exemplary primary shredder for use with the primary shredding unit shown in FIG. 15.

FIG. 16 is a perspective view of primary shredder 1502 including a plurality of rotating teeth (not shown) configured to shred a solid waste stream to a predetermined size. Shredding the solid waste stream ensures the final SRF product is a consistent size.

Figure 17:
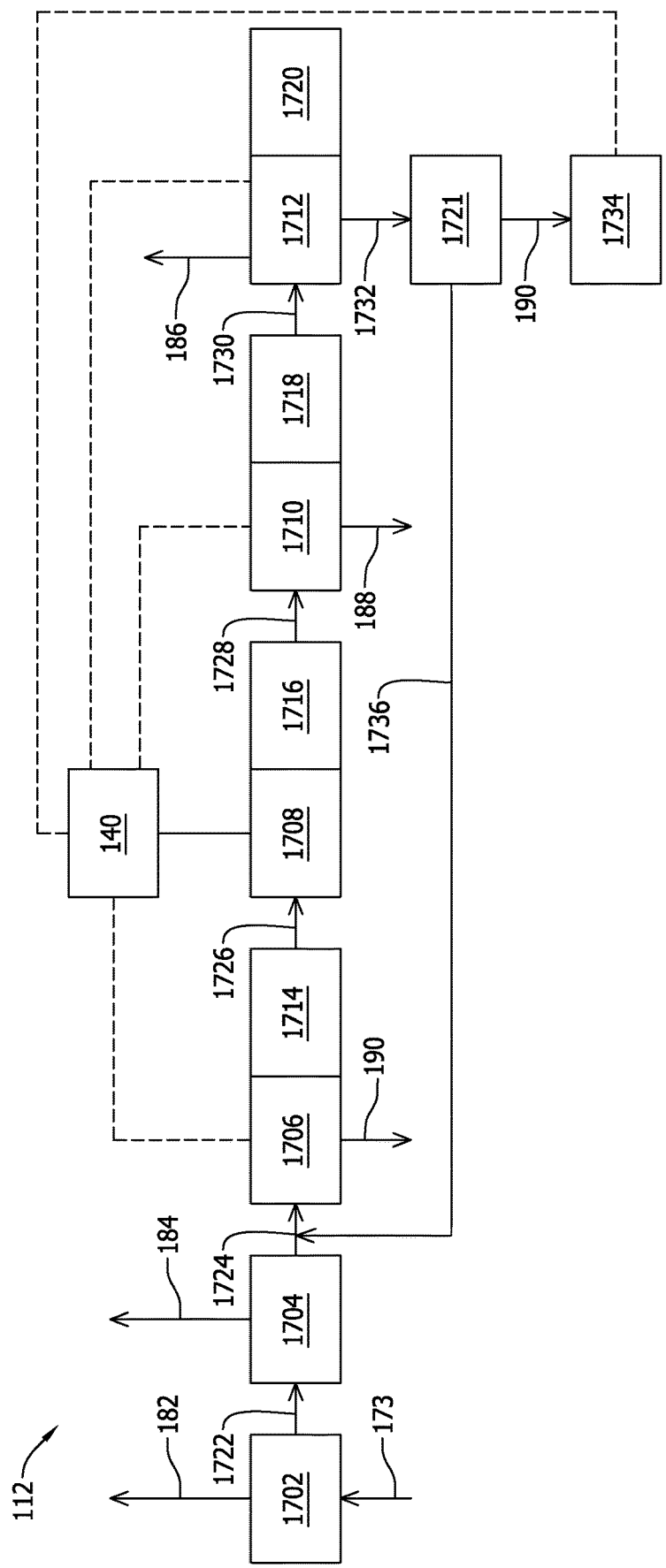
FIG. 17 is a block flow diagram of an exemplary physical separation unit within the Municipal Solid Waste Recycling Process shown in FIG. 1.

FIG. 17 is a block flow diagram of physical separation unit 112. Physical separation unit 112 receives post-sort to physical separation steam 173 and glass separation to physical separation steam 178 and is configured to sort the received streams based on the physical properties of the streams. Physical separation unit 112 includes a drum magnet 1702, an eddy current separator 1704, a plurality of optical sorters 1706, 1708, 1710, and 1712, a plurality of robotic arm units 1714, 1716, 1718, and 1720, and a heavy/light separator 1721. Drum magnet 1702 receives post-sort to physical separation steam 173 from post-sort unit 106 and removes ferrous metals from post-sort to physical separation steam 173 and conveys the ferrous metals to ferrous metal unit 124 by physical separation to ferrous metal steam 182. Drum magnet 1702 conveys the non-ferrous solid waste to eddy current separator 1704 by a drum magnet to eddy current separator stream 1722. Eddy current separator 1704 removes non-ferrous metals from drum magnet to eddy current separator stream 1722 and conveys the remainder to a first optical sorter 1706 by an eddy current separator to first optical sorter stream 1724. Eddy current separator 1704 conveys the non-ferrous metals to non-ferrous metal unit 126 by physical separation to non-ferrous metal steam 184.

First optical sorter 1706 removes all plastic from eddy current separator to first optical sorter stream 1724 and conveys the plastic to a second optical sorter 1708 by a first optical sorter to second optical sorter stream 1726. The remainder of eddy current separator to first optical sorter stream 1724 is conveyed to secondary shredding unit 114 by physical separation to secondary shredding stream 190. Second optical sorter 1708 removes polyvinyl chloride (PVC) plastics from first optical sorter to second optical sorter stream 1726 because PVC has a high chlorine content. The removed PVC is conveyed to a container (not shown) and sold. Second optical sorter 1708 conveys the remaining plastic solid waste to third optical sorter 1710 by a second optical sorter to third optical sorter stream 1728. Third optical sorter 1710 removes PET from second optical sorter to third optical sorter stream 1728 and conveys the PET to PET unit 130 by physical separation to PET steam 188. Third optical sorter 1710 conveys the remaining plastic solid waste to a fourth optical sorter 1712 by a third optical sorter to fourth optical sorter stream 1730. Fourth optical sorter 1712 removes HDPE from third optical sorter to fourth optical sorter stream 1730 and conveys the HDPE to HDPE unit 128 by physical separation to HDPE steam 186. A robotic arm unit 1714, 1716, 1718, and 1720 is coupled to each optical sorter 1706, 1708, 1710, and 1712 and provide quality control after each optical sorter 1706, 1708, 1710, and 1712. Specifically, a first robotic arm unit 1714 is coupled to first optical sorter 1706, a second robotic arm unit 1716 is coupled to second optical sorter 1708, a third robotic arm unit 1718 is coupled to third optical sorter 1710, and a fourth robotic arm unit 1720 is coupled to fourth optical sorter 1712. The remaining plastic solid waste is conveyed to heavy/light separator 1721 by a fourth optical sorter to heavy/light separator stream 1732. Heavy/light separator 1721 is configured to separate fourth optical sorter to heavy/light separator stream 1732 by weight. Specifically, the heavier solid waste particles are conveyed to, and combine with, eddy current separator to first optical sorter stream 1724 to be recycled to first optical sorter 1706 by a heavy/light separator to first optical sorter stream 1736, and the lighter solid waste particles are conveyed to secondary shredding unit 114 by physical separation to secondary shredding stream 190. A seventh analyzing station 1734 is positioned on physical separation to secondary shredding stream 190 and configured to analyze physical separation to secondary shredding stream 190.

Figure 18:
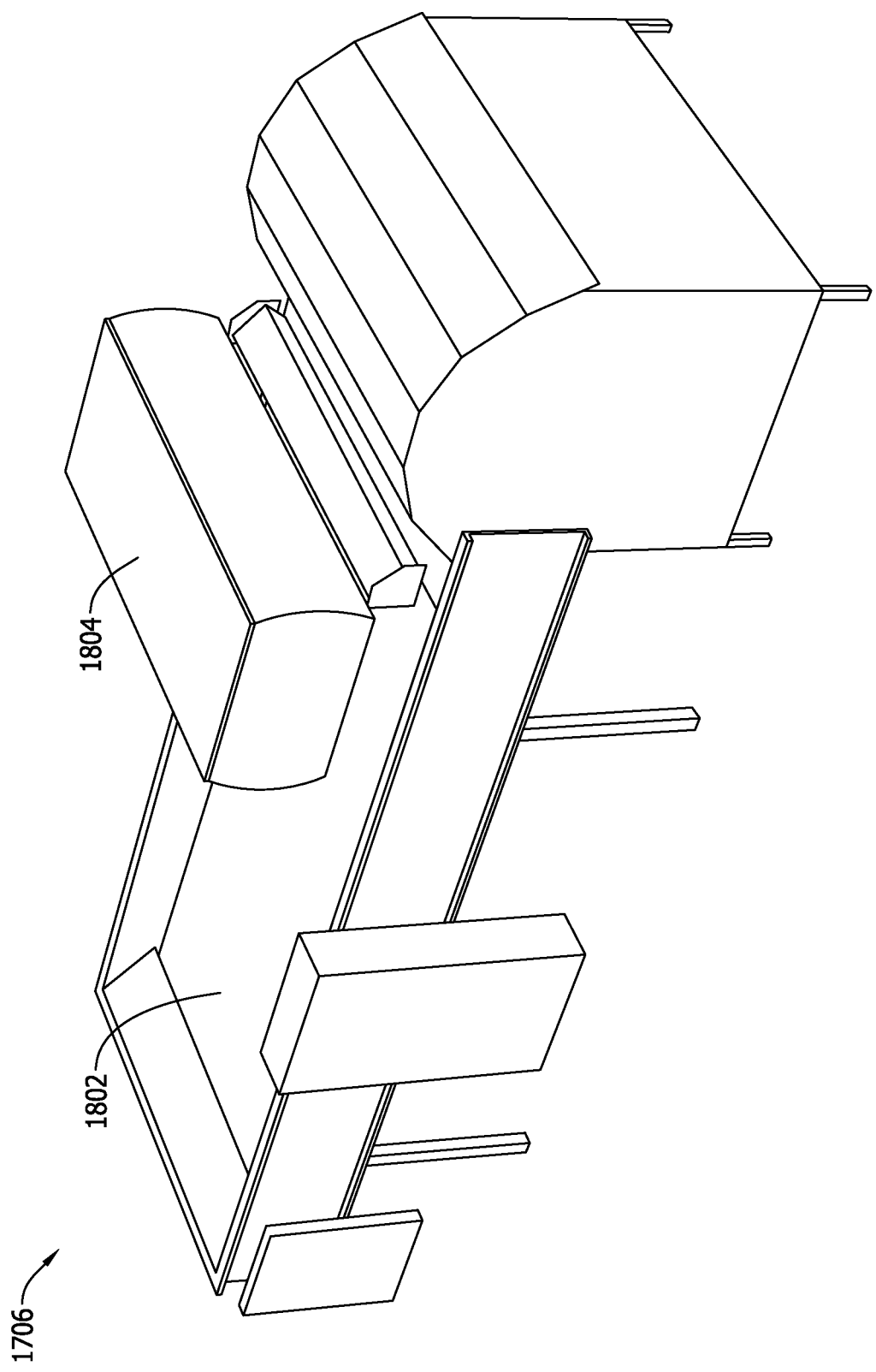
FIG. 18 is a perspective view of an exemplary optical sorter for use with the physical separation unit shown in FIG. 17.

FIG. 18 is a perspective view of optical sorter 1706, 1708, 1710, and 1712 including a conveyor 1802, an optical sensor 1804, an air valve (not shown), and at least two separating wells (not shown). In the exemplary embodiment, optical sensor 1804 is a near infrared sensor configured to detect plastic and to measure the specific energy of the solid waste stream. Optical sensor 1804 is positioned above conveyor 1802. Solid wasted is conveyed by conveyor 1802 beneath optical sensor 1804 such that optical sensor 1804 detects plastic on conveyor 1802 and measures the specific energy of the solid waste stream. Optical sensor 1804 sends the data to a controller (not shown) which directs the air valve to channel a flow of compressed air at each particle of solid waste. The flow of compressed air directs the particle into the appropriate separating well. Additionally, the specific energy data collected by optical sensor 1804 is sent to control unit 140.

Control unit 140 controls optical sorters 1706, 1708, 1710, and 1712 to control the specific energy of the final SRF product. Plastics typically have a high specific energy as well as a high chlorine content. Allowing more plastic to flow to SRF production unit 116 increases the specific energy and the chlorine content of the final SRF product. Control unit 140 allows more plastic to flow to SRF production unit 116 when analyzing stations 206, 504, 506, 710, 712, 1504, 1734, 2202, and 2206 indicate that the specific energy of the final SRF product is below the minimum specific energy value. Because analyzing stations 206, 504, 506, 710, 712, 1504, 1734, 2202, and 2206 are located throughout MSWR process 100, the specific energy of the final SRF product is known before it reaches SRF production unit 116. As such, control unit 140 controls optical sorters 1706, 1708, 1710, and 1712 to add plastic, and increase the specific energy of the final SRF product, before the SRF reaches SRF production unit 116. Accordingly, control unit 140; analyzing stations 206, 504, 506, 710, 712, 1504, 1734, 2202, and 2206; and optical sorters 1706, 1708, 1710, and 1712 improve the MSWR process 100 by maintaining the specific energy of the final SRF product within the narrow range.

Additionally, control unit 140 controls optical sorters 1706, 1708, 1710, and 1712 to control the chlorine content of the final SRF product. While it is important to control the volume of plastic flowing into SRF production unit 116 to control the final specific energy of the final SRF product, it is equally important to limit the volume of plastic flowing into SRF production unit 116 to control the final chlorine content of the final SRF product. If the chlorine content is above a set level, control unit 140 controls optical sorters 1706, 1708, 1710, and 1712 to limit the amount of plastic flowing to SRF production unit 116. If the chlorine content is above a set level and the specific energy of the final SRF product is below the minimum specific energy value, control unit 140 controls optical sorters 1706, 1708, 1710, and 1712 to limit the amount of plastic flowing to SRF production unit 116 and controls the rest of MSWR process 100 to increase the specific energy of the final SRF product without adding additional plastic to the final SRF product. For example, control unit 140 may control trommel 502 to increase the specific energy of the final SRF product rather than adding additional plastic.

Figure 19:
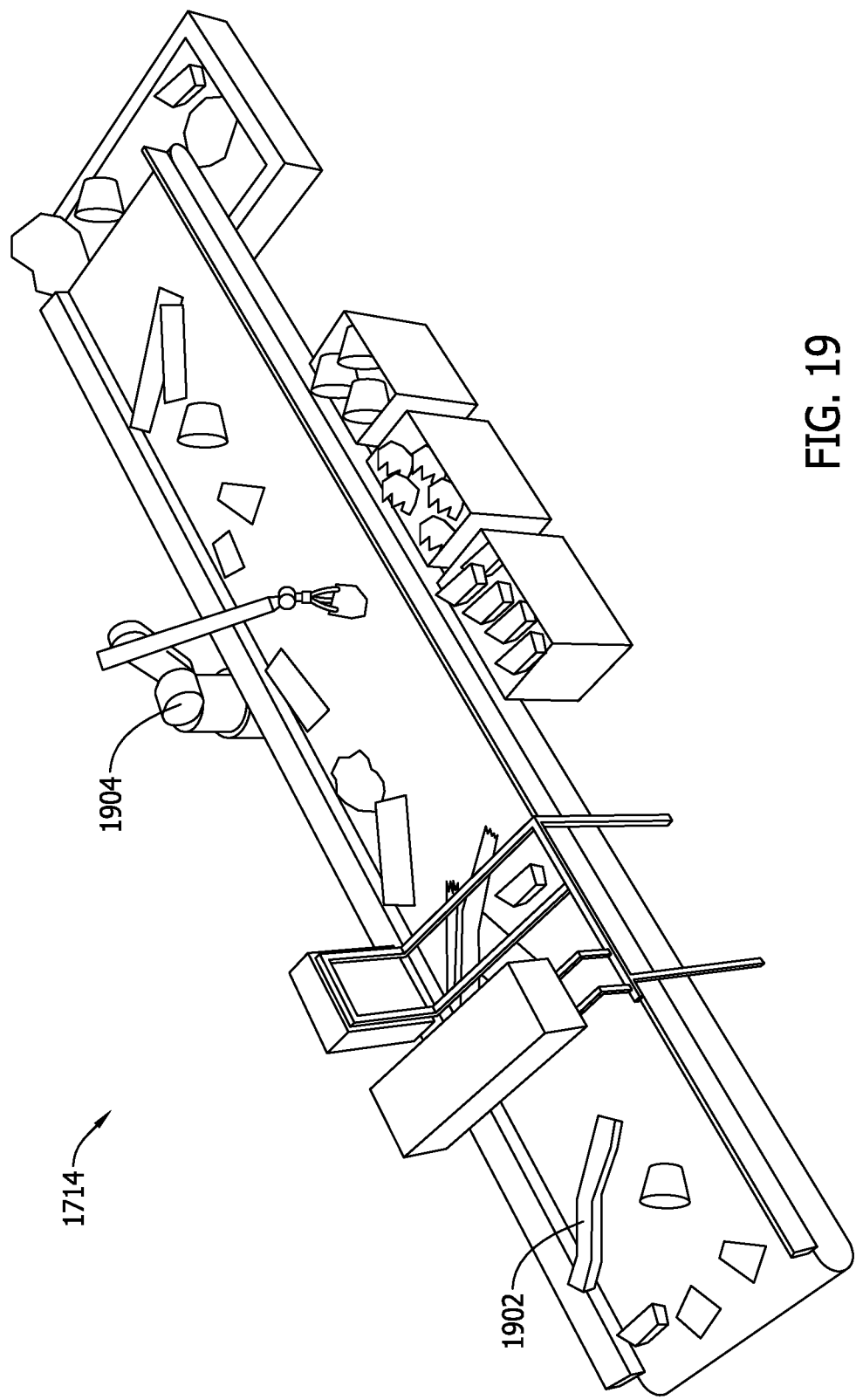
FIG. 19 is a perspective view of an exemplary robotic arm unit for use with the physical separation unit shown in FIG. 17.

FIG. 19 is a perspective view of robotic arm unit 1714, 1716, 1718, and 1720 including a conveyor 1902 and a robotic arm 1904. Solid waste is conveyed past robotic arm 1904 by conveyor 1902. An operator manipulates robotic arm 1904 to capture plastics not correctly sorted by optical sorters 1706, 1708, 1710, and 1712.

Figure 20:
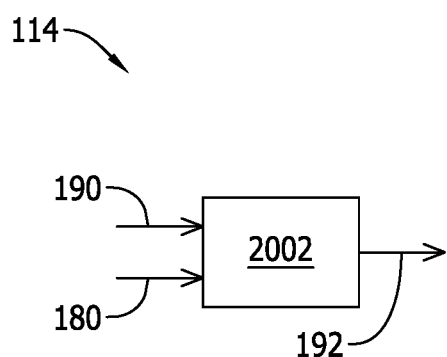
FIG. 20 is a block flow diagram of an exemplary secondary shredding unit within the Municipal Solid Waste Recycling Process shown in FIG. 1.

FIG. 20 is a block flow diagram of secondary shredding unit 114. Secondary shredding unit 114 receives primary shredding to secondary shredding stream 180 and physical separation to secondary shredding stream 190 and includes a secondary shredder 2002. Secondary shredder 2002 is configured to shred the received streams and convey the shredded solid waste to SRF production unit 116 by secondary shredding to SRF production stream 192.

Figure 21:
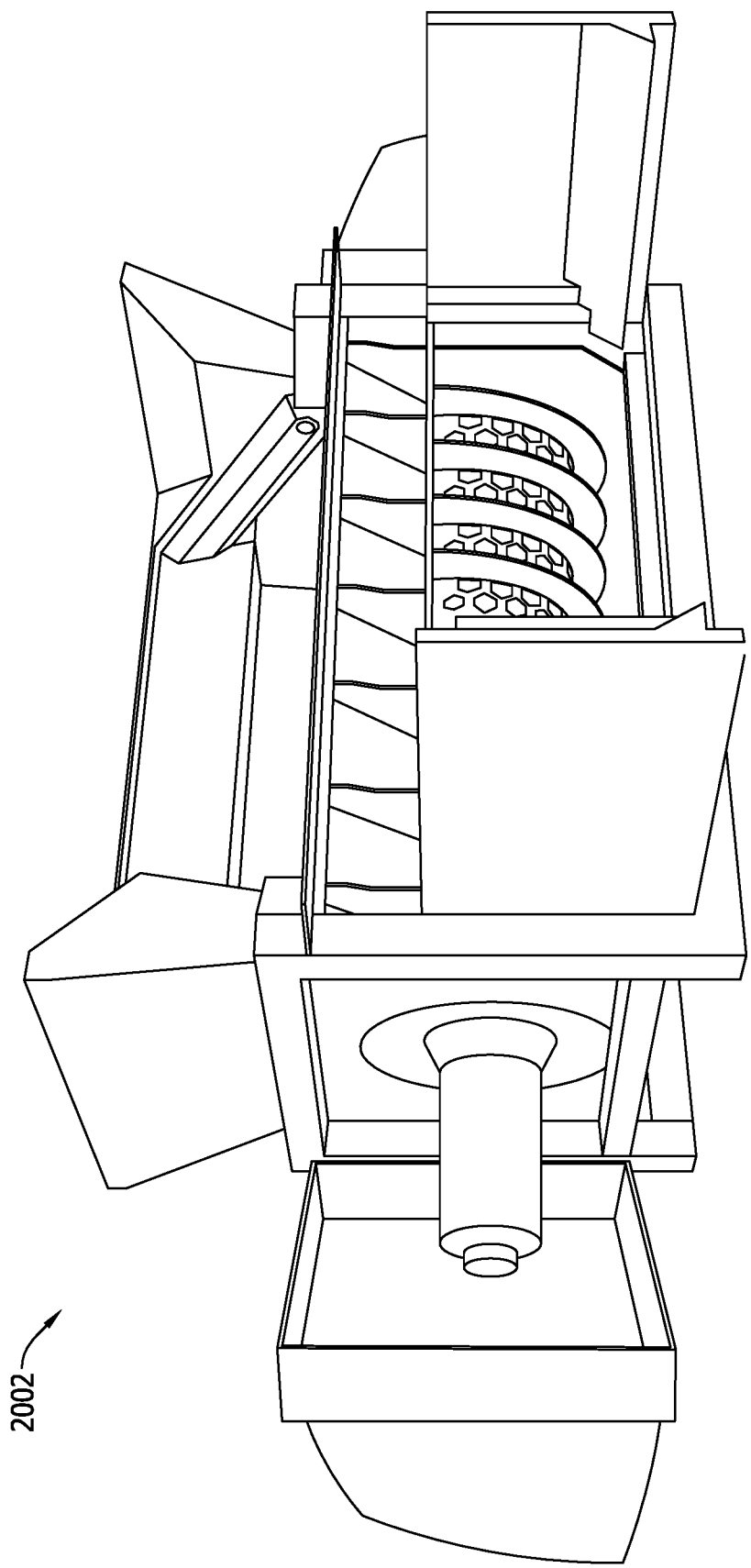
FIG. 21 is a perspective view of an exemplary secondary shredder for use with the secondary shredding unit shown in FIG. 20.

FIG. 21 is a perspective view of secondary shredder 2002 including a plurality of rotating teeth (not shown) configured to shred a solid waste stream to a predetermined size. Shredding the solid waste stream ensures the final SRF product is a consistent size.

Figure 22:
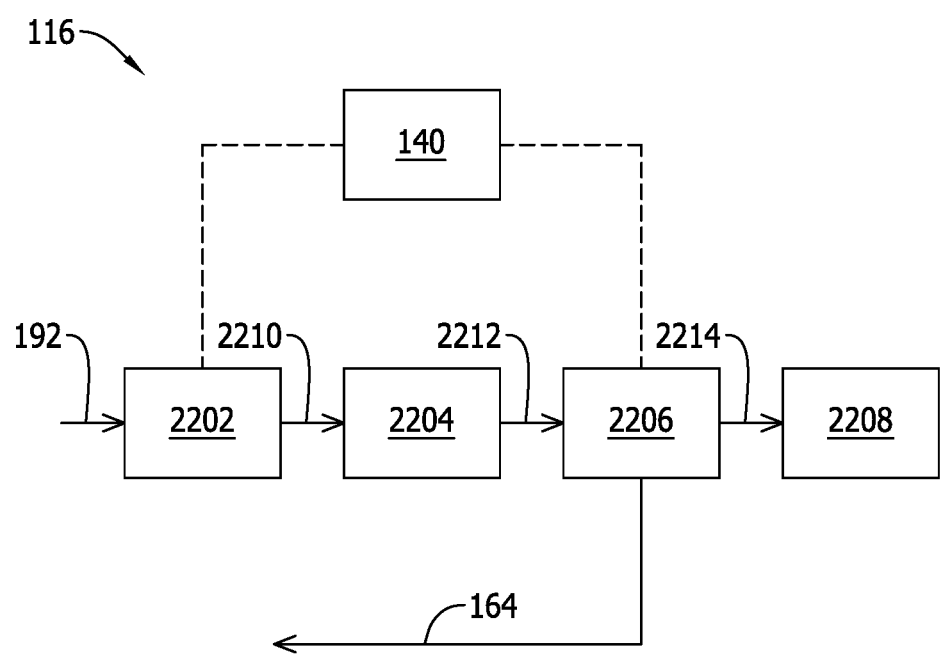
FIG. 22 is a block flow diagram of an exemplary SRF production unit within the Municipal Solid Waste Recycling Process shown in FIG. 1.

FIG. 22 is a block flow diagram of SRF production unit 116 including an eighth analyzing station 2202, a fluidized bed dryer 2204, a ninth analyzing station 2206, and a baler 2208. Eighth analyzing station 2202 receives and analyzes secondary shredding to SRF production stream 192. Eighth analyzing station 2202 then conveys secondary shredding to SRF production stream 192 to fluidized bed dryer 2204 by an eighth analyzing station to fluidized bed dryer stream 2210. Eighth analyzing station 2202 measures the moisture content of secondary shredding to SRF production stream 192 and controls fluidized bed dryer 2204 based on the measured moisture content. Fluidized bed dryer 2204 is configured to remove moisture or dry eighth analyzing station to fluidized bed dryer stream 2210. If the moisture content of secondary shredding to SRF production stream 192 is above the minimum moisture content value, eighth analyzing station 2202 increases the rate of moisture removal by fluidized bed dryer 2204. Fluidized bed dryer 2204 conveys dried eighth analyzing station to fluidized bed dryer stream 2210 to ninth analyzing station 2206 by a fluidized bed dryer to ninth analyzing station stream 2212. Ninth analyzing station 2206 measures the moisture content, specific energy, chlorine content, and mercury content of fluidized bed dryer to ninth analyzing station stream 2212. If fluidized bed dryer to ninth analyzing station stream 2212 is non-compliant with the International Standards, ninth analyzing station 2206 recycles fluidized bed dryer to ninth analyzing station stream 2212 back to post-sort unit 106 by SRF production to post-sort recycle stream 164. If fluidized bed dryer to ninth analyzing station stream 2212 has a specific energy within the predetermined specific energy range, ninth analyzing station 2206 conveys fluidized bed dryer to ninth analyzing station stream 2212 to baler 2208 by a ninth analyzing station to baler stream 2214. Baler 2208 is configured to form bales of SRF from ninth analyzing station to baler stream 2214. The bales of SRF are then sent to a SRF handling facility for further processing.

Figure 23:
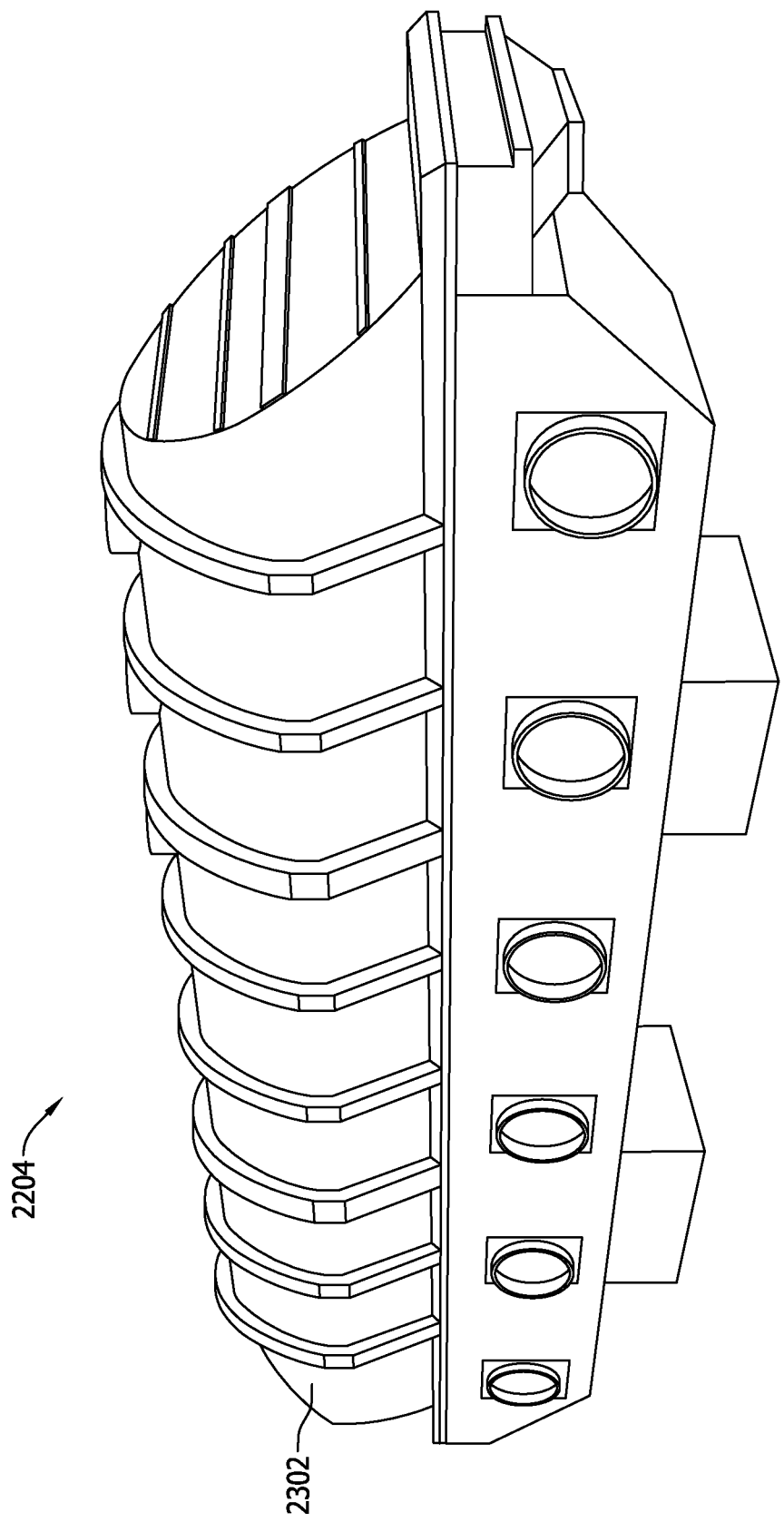
FIG. 23 is a perspective view of an exemplary fluidized bed dryer for use with the SRF production unit shown in FIG. 22.

FIG. 23 is a perspective view of fluidized bed dryer 2204. Fluidized bed dryer 2204 is a non-thermal dryer including a shell 2302 and a plurality of vibrating fluidized bed dryers (not shown) configured to produce non-thermal heat to dry the solid waste. Specifically, fluidized bed dryer 2204 is configured to reduce the moisture content of solid waste below 15%.

Figure 24:
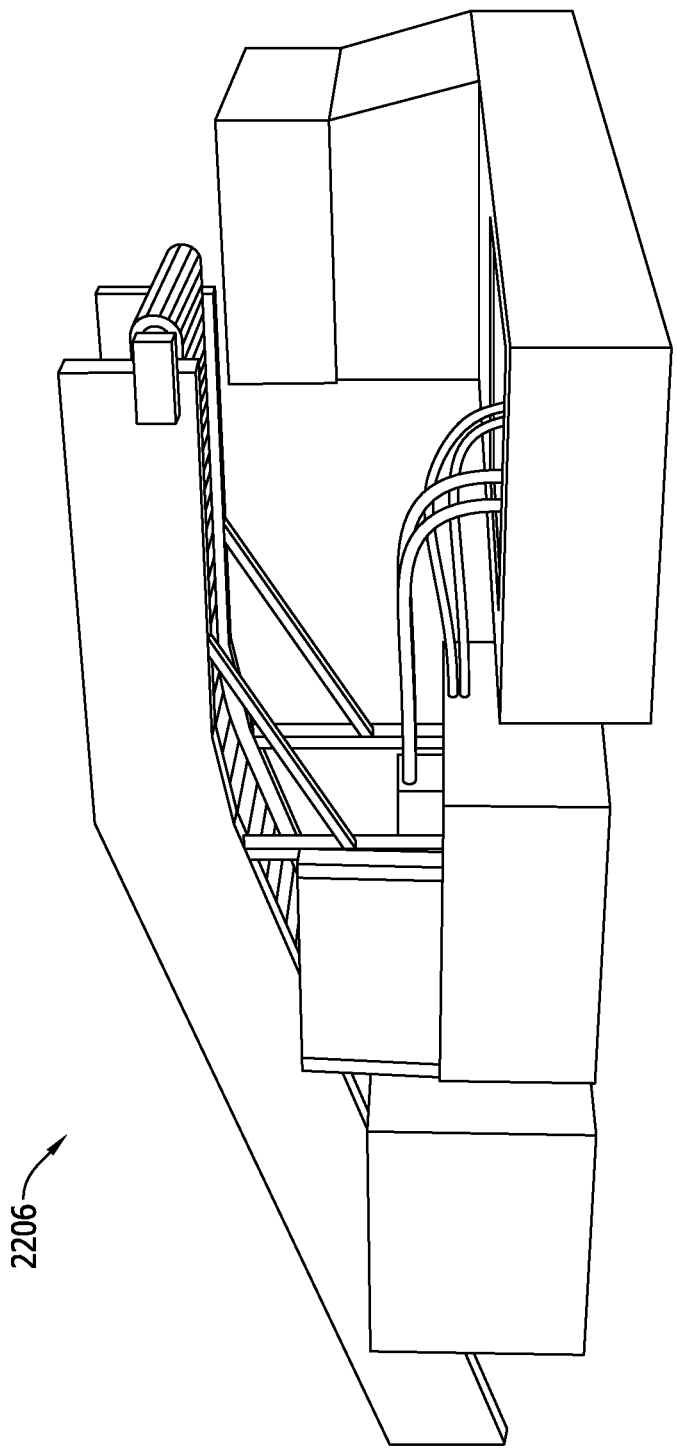
FIG. 24 is a perspective view of an exemplary baler for use with the SRF production unit shown in FIG. 22.

FIG. 24 is a perspective view of baler 2208 configured to compress solid waste into bales of solid waste that are easy to handle and transport.

Figure 25:
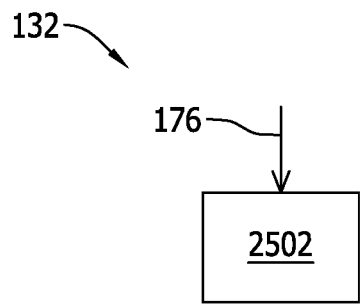
FIG. 25 is a block flow diagram of an exemplary sand unit within the Municipal Solid Waste Recycling Process shown in FIG. 1.

FIG. 25 is a block flow diagram of sand unit 132 including a glass crusher 2502 configured to receive glass separation to sand stream 176 and crush glass separation to sand stream 176 into sand. The sand is then shipped to a sand handling facility.

Figure 26:
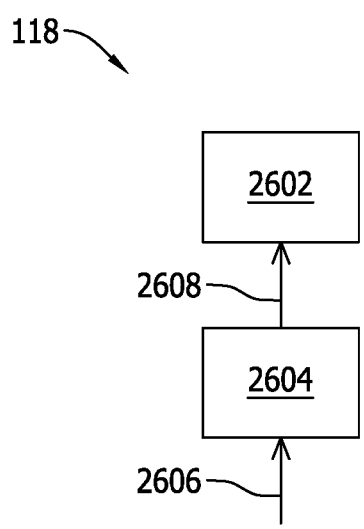
FIG. 26 is a block flow diagram of representative of an exemplary recyclable material unit within the Municipal Solid Waste Recycling Process shown in FIG. 1.

FIG. 26 is a block flow diagram of recyclable material units 118, 120, 122, 124, 126, 128, and/or 130. Recyclable material units 118, 120, 122, 124, 126, 128, and/or 130 each typically include a baler 2602 substantially similar to baler 2206 described above, and optionally, a rocket washer 2604. Baler 2602 is configured to form bales of recyclable material from a received stream 2606. The bales of recyclable material are then sent to an appropriate recycling facility for further processing. If rocket washer 2604 is included, rocket washer 2604 receives received stream 2606 and washes the recyclable material within received stream 2606 to ensure that the produced recyclable material is clean and is high quality. Rocket washer 2604 then conveys the cleaned recyclable material to baler 2602 by a rocket washer to baler stream 2608.

Figure 27:
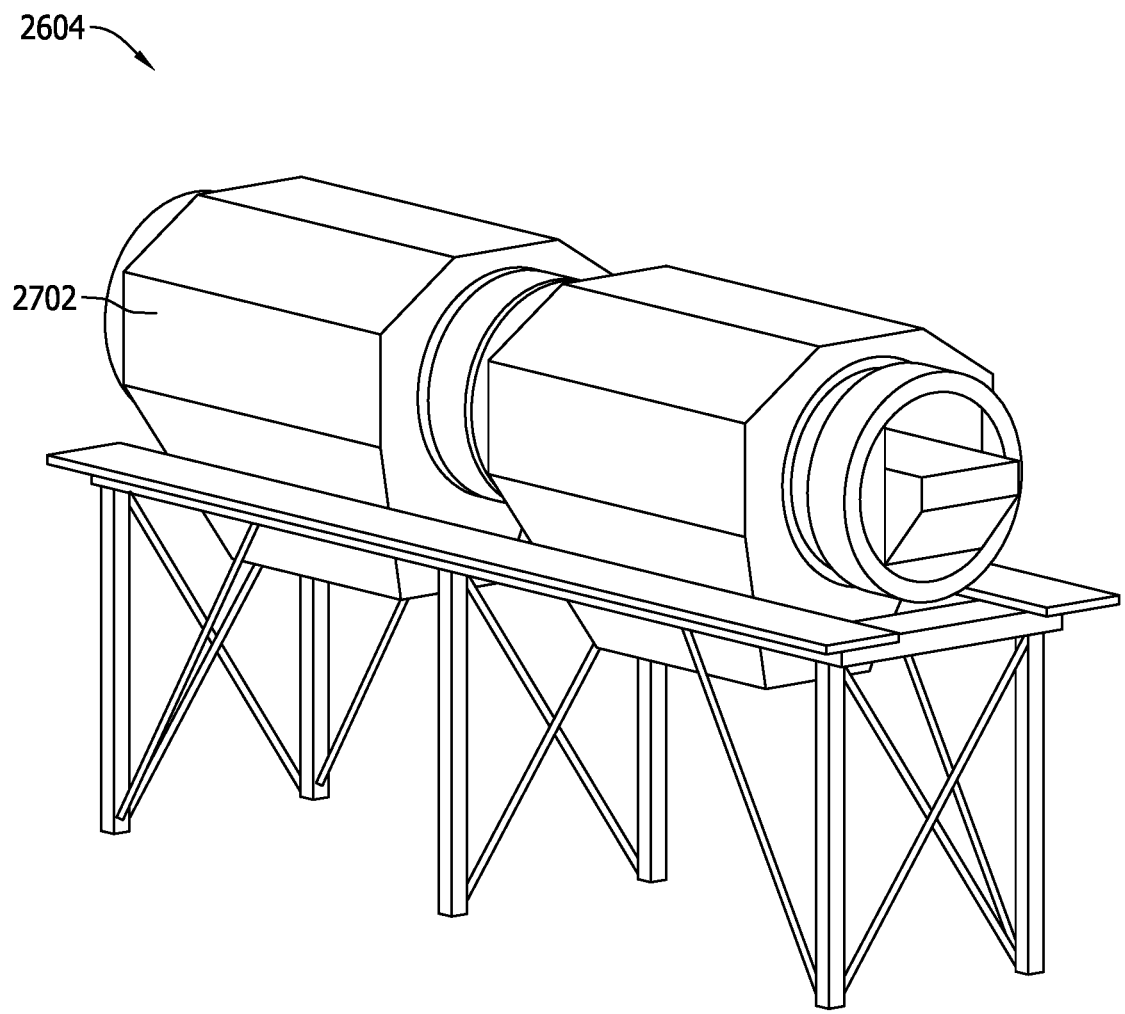
FIG. 27 is a perspective view of an exemplary rocket washer for use with the recyclable material unit shown in FIG. 26.

FIG. 27 is a perspective view of rocket washer 2604 including a shell 2702 and a trommel (not shown) which rotates within shell 2702. Rocket washer 2604 further includes a plurality of nozzles (not shown) within shell 2702 configured to spray a stream of recyclable material with water or a solution. The trommel rotates the stream of recyclable material, and the water or solution removes grease and dirt from the stream of recyclable material.

Figure 28:
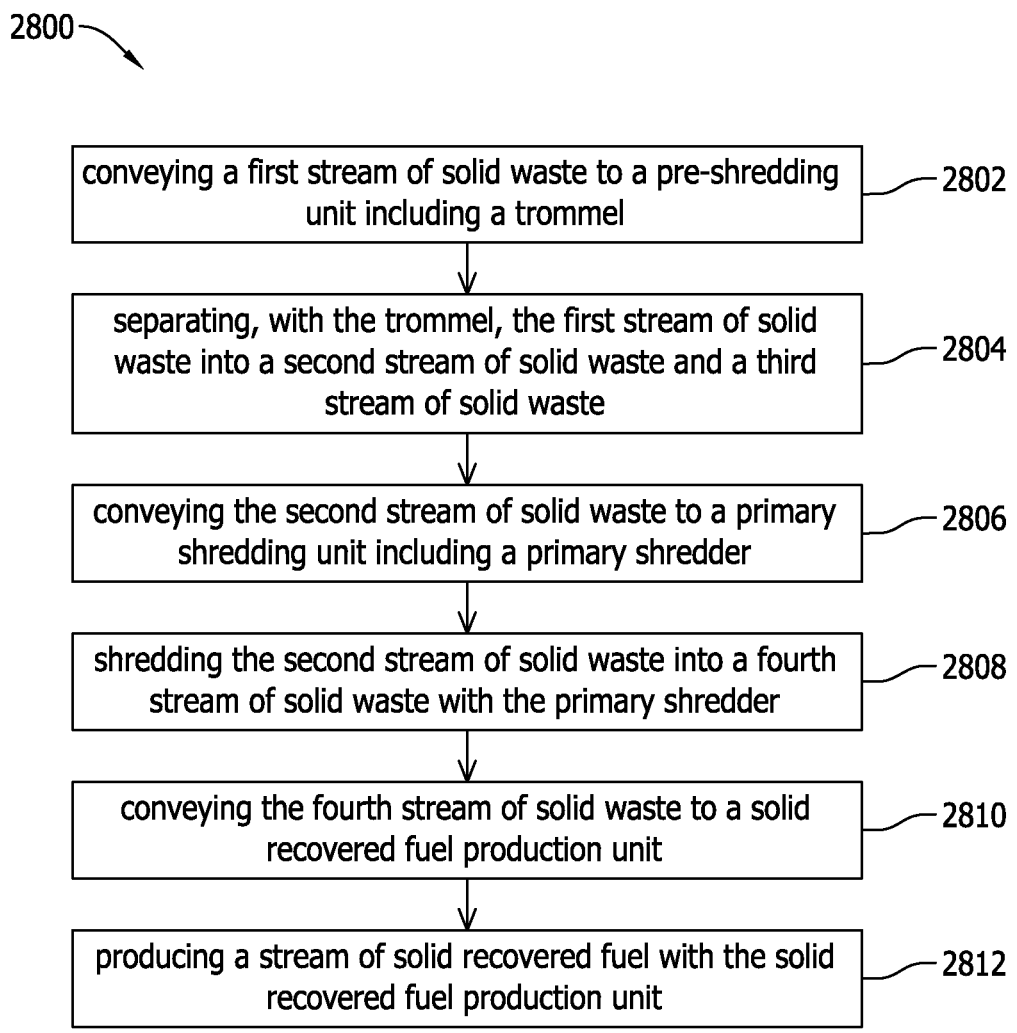
FIG. 28 is a flow diagram of a method of manufacturing a solid recovered fuel.

FIG. 28 is a flow diagram of a method 2800 of manufacturing a solid recovered fuel. The method includes conveying 2802 a first stream of solid waste to a pre-shredding unit including a trommel. The method also includes separating 2804, with the trommel, the first stream of solid waste into a second stream of solid waste and a third stream of solid waste. The method further includes conveying 2806 the second stream of solid waste to a primary shredding unit including a primary shredder. The method also includes shredding 2808 the second stream of solid waste into a fourth stream of solid waste with the primary shredder. The method further includes conveying 2810 the fourth stream of solid waste to a solid recovered fuel production unit. The method also includes producing 2812 a stream of solid recovered fuel with the solid recovered fuel production unit.

Figure 29:
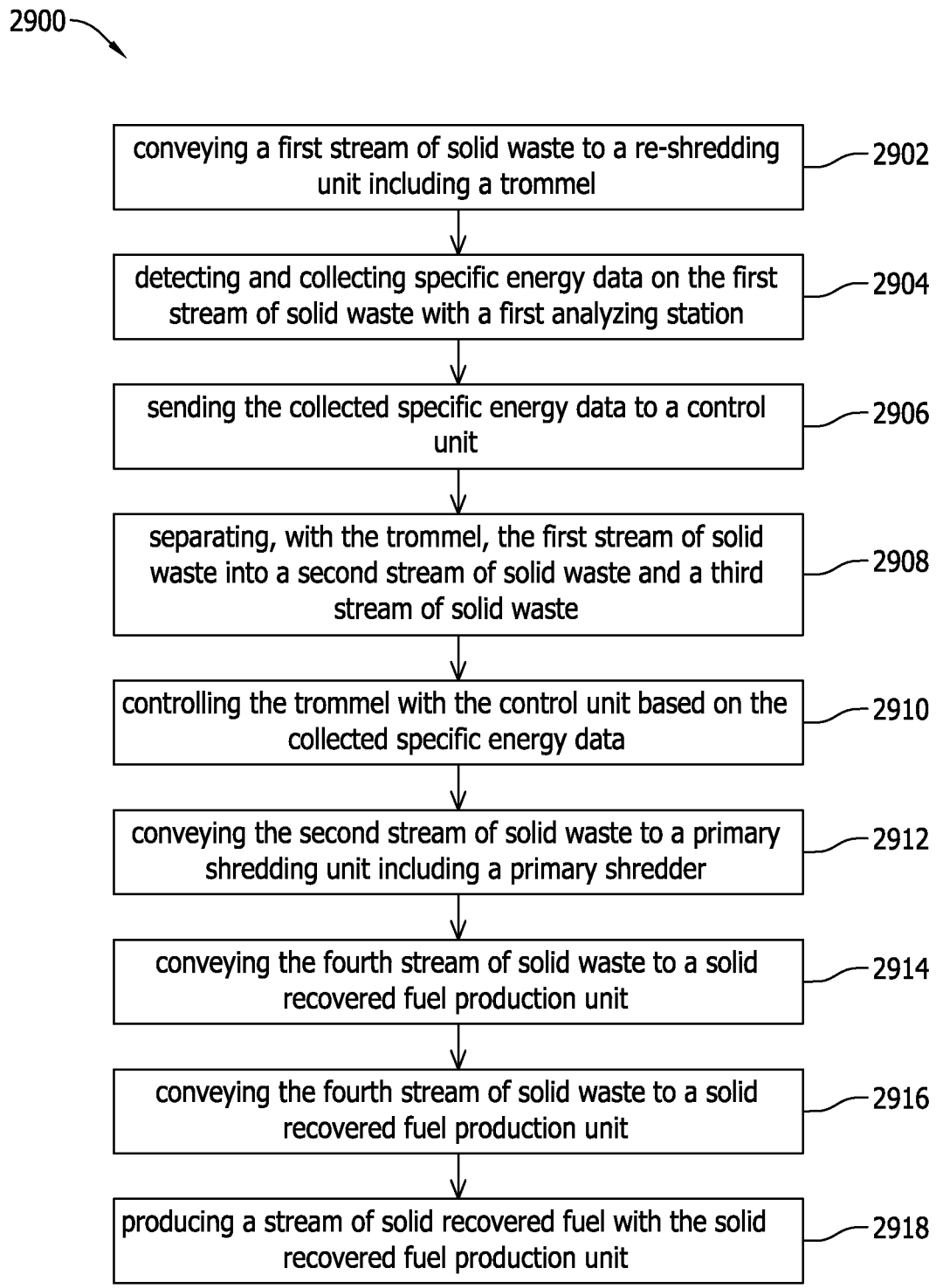
FIG. 29 is a flow diagram of a method of manufacturing a solid recovered fuel.

FIG. 29 is a flow diagram of a method 2900 of manufacturing a solid recovered fuel. The method includes conveying 2902 a first stream of solid waste to a pre-shredding unit including a trommel. The method also includes detecting and collecting 2904 specific energy data on the first stream of solid waste with a first analyzing station. The method further includes sending 2906 the collected specific energy data to a control unit. The method also includes separating 2908, with the trommel, the first stream of solid waste into a second stream of solid waste and a third stream of solid waste. The method further includes controlling 2910 the trommel with the control unit based on the collected specific energy data. The method also includes conveying 2912 the second stream of solid waste to a primary shredding unit including a primary shredder. The method further includes shredding 2914 the second stream of solid waste into a fourth stream of solid waste with the primary shredder. The method also includes conveying 2916 the fourth stream of solid waste to a solid recovered fuel production unit. The method further includes producing 2918 a stream of solid recovered fuel with the solid recovered fuel production unit.

The embodiments described herein include a Municipal Solid Waste Recycling (MSWR) Process configured to produce SRF from solid municipal waste. MSWR process is typically housed within a MSWR facility and includes at least a pre-shredding unit, a shredding unit, a SRF production unit and a control unit. The pre-shredding unit receives a stream of municipal solid waste and sorts the stream of municipal solid waste by size and content. Specifically, the pre-shredding unit removes large, bulky, or difficult to shred materials from the municipal solid waste stream that may clog or otherwise impair the operation of the primary shredder, increasing the downtime of the facility. The pre-shredding unit conveys the sorted solid waste stream to the primary shredder where it is shredded to a predetermined size. The shredded solid waste is then conveyed to the SRF production unit where it is converted into SRF. Pre-sorting the municipal solid waste in the pre-shredding unit reduces the down time of MSWR facility by removing large, bulky, or difficult to shred materials from the municipal solid waste stream that may clog or otherwise impair the operation of the primary shredder.

The control unit includes a plurality of analyzing stations and optical sensors positioned within the MSWR facility and configured to detect and analyze specific solid waste material streams within the MSWR facility. The analyzing stations are configured to detect and collect specific energy data of the analyzed solid waste material streams. The collected specific energy data is sent to the control unit, and the control unit controls the MSWR process based on the collected specific energy data. Specifically, because the analyzing stations are located throughout the MSWR facility, the analyzing stations collect specific energy data from waste streams throughout the MSWR process. The collected specific energy data allows the control unit to control MSWR process such that the specific energy of the final SRF product meets or exceeds the preset values. As such, little to no SRF is discarded as a result of being outside the preset values. Accordingly, the control unit and the analyzing stations improve the economics of the MSRW facility by ensuring compliant SRF is produced by the MSWR process. Additionally, the control unit and the analyzing stations control the MSWR process to maintain the specific energy of the final SRF product within a narrow range above the preset minimum specific energy values.

An exemplary technical effect of the methods, systems, and apparatus described herein includes at least one of: a) producing SRF from municipal solid waste, b) reducing down time of a MSWR facility, c) ensuring the specific energy of the final SRF product consistently meets or exceeds preset values, and d) controlling the specific energy of the final SRF product within a narrow range.

Exemplary embodiments of a MSWR facility configured to produce SRF are described above in detail. The MSWR facility, and methods of using and manufacturing SRF with the facility are not limited to the specific embodiments described herein, but rather, components of systems and/or steps of the methods may be utilized independently and separately from other components and/or steps described herein. For example, the methods may also be used in combination with other manufacturing systems, and are not limited to practice with only the MSWR processes and methods as described herein. Rather, the exemplary embodiment can be implemented and utilized in connection with many other manufacturing facilities.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A municipal solid waste recycling facility for producing a solid recovered fuel, said municipal solid waste recycling facility comprising:
   a pre-shredding unit comprising:
      a trommel configured to sort a first stream of solid waste by size into a second stream of solid waste and a third stream of solid waste; and
      a drum feeder configured to meter the flow of the first stream of solid waste into said municipal solid waste recycling facility, wherein said drum feeder comprises a transport device and a metering wheel adjustably positioned a vertical height above said transport device, and wherein said drum feeder is configured to meter the flow of the first stream of solid waste into said municipal solid waste recycling facility by adjusting the vertical distance above said transport device; and
   a shredding unit comprising a primary shredder configured to shred the second stream of solid waste.

2. The municipal solid waste recycling facility of claim 1, wherein said pre-shredding unit further comprises an analyzing station configured to detect and collect data on a specific energy of the first stream of solid waste, wherein said drum feeder is configured to meter the flow of the first stream of solid waste into said municipal solid waste recycling facility based on the collected data.

3. A municipal solid waste recycling facility for producing a solid recovered fuel, said municipal solid waste recycling facility comprising:
   a pre-shredding unit comprising:
      a trommel configured to sort a first stream of solid waste by size into a second stream of solid waste and a third stream of solid waste; and
      a drum feeder configured to meter the flow of the first stream of solid waste into said municipal solid waste recycling facility, wherein said drum feeder comprises a transport device and a metering wheel adjustably positioned a distance above said transport device, wherein said drum feeder is configured to meter the flow of the first stream of solid waste into said municipal solid waste recycling facility by adjusting the distance above said transport device;
   a shredding unit comprising a primary shredder configured to shred the second stream of solid waste;
   a plurality of analyzing stations configured to detect and collect data on a specific energy of two solid waste streams within said municipal solid waste recycling facility; and
   a control unit communicatively coupled to said plurality of analyzing stations such that said control unit receives the collected data from said plurality of analyzing stations, wherein said control unit is configured to control said trommel based on the collected data.

4. The municipal solid waste recycling facility of claim 3, wherein said control unit is configured to control said drum feeder based on the collected data.

5. The municipal solid waste recycling facility of claim 3, wherein said pre-shredding unit further comprises an auger screen configured to separate two-dimensional waste particles from three-dimensional waste particles.

6. The municipal solid waste recycling facility of claim 3 further comprising a plurality of conveyors configured to convey streams of solid waste throughout said municipal solid waste recycling facility, wherein said control unit controls a speed of said plurality of conveyors based on the collected data.

7. A municipal solid waste recycling facility for producing a solid recovered fuel, said municipal solid waste recycling facility comprising:
   a pre-shredding unit comprising:
      a trommel configured to sort a first stream of solid waste by size into a second stream of solid waste and a third stream of solid waste; and
      a drum feeder configured to meter the flow of the first stream of solid waste into said municipal solid waste recycling facility, wherein said drum feeder comprises a transport device and a metering wheel positioned and adjustable a vertical height above said transport device;
   a shredding unit comprising a primary shredder configured to shred the second stream of solid waste; and an analyzing station configured to detect and collect data on at least one of a moisture content, a density, and a specific energy of the first stream of solid waste, wherein said drum feeder is configured to meter the flow of the first stream of solid waste into said municipal solid waste recycling facility based on the collected data.

8. The municipal solid waste recycling facility of claim 1, wherein said pre-shredding unit further comprises an analyzing station configured to detect and collect data on a moisture content of the first stream of solid waste, wherein said drum feeder is configured to meter the flow of the first stream of solid waste into said municipal solid waste recycling facility based on the collected data.

9. The municipal solid waste recycling facility of claim 1, wherein said pre-shredding unit further comprises an analyzing station configured to detect and collect data on a density of the first stream of solid waste, wherein said drum feeder is configured to meter the flow of the first stream of solid waste into said municipal solid waste recycling facility based on the collected data.

\* \* \* \* \*